(12) United States Patent
Katayama

(10) Patent No.: US 7,346,640 B2
(45) Date of Patent: Mar. 18, 2008

(54) IMAGE PROCESSING APPARATUS SUPPORTING BOTH DISCRETE COSINE TRANSFORM AND DISCRETE WAVELET TRANSFORM

(75) Inventor: Yoichi Katayama, Kanagawa (JP)

(73) Assignee: NEC Electronics Corporation (JP)

( * ) Notice: Subject to any disclaimer, the term of this patent is extended or adjusted under 35 U.S.C. 154(b) by 757 days.

(21) Appl. No.: 10/671,907

(22) Filed: Sep. 25, 2003

(65) Prior Publication Data

US 2004/0062446 A1 Apr. 1, 2004

(30) Foreign Application Priority Data

Sep. 26, 2002 (JP) ............................. 2002-281937

(51) Int. Cl.
*G06F 17/14* (2006.01)
(52) U.S. Cl. .................. 708/402; 708/400; 708/401; 382/234; 382/239; 382/248; 382/250
(58) Field of Classification Search .................... None
See application file for complete search history.

(56) References Cited

U.S. PATENT DOCUMENTS

| | | | | |
|---|---|---|---|---|
| 5,347,479 | A * | 9/1994 | Miyazaki | 708/400 |
| 5,398,067 | A * | 3/1995 | Sakamoto | 375/240.19 |
| 5,453,945 | A * | 9/1995 | Tucker et al. | 708/400 |
| 5,838,377 | A * | 11/1998 | Greene | 375/240.11 |
| 5,984,514 | A * | 11/1999 | Greene et al. | 708/203 |
| 6,029,185 | A * | 2/2000 | Tonomura | 708/402 |
| 6,223,195 | B1 * | 4/2001 | Tonomura | 708/402 |
| 6,424,986 | B1 * | 7/2002 | Li et al. | 708/400 |
| 6,466,957 | B1 * | 10/2002 | Messerly et al. | 708/300 |
| 6,499,045 | B1 * | 12/2002 | Turney et al. | 708/401 |
| 6,526,430 | B1 * | 2/2003 | Hung et al. | 708/523 |
| 6,530,010 | B1 * | 3/2003 | Hung et al. | 712/1 |
| 6,640,015 | B1 * | 10/2003 | Lafruit et al. | 382/260 |
| 6,785,700 | B2 * | 8/2004 | Masud et al. | 708/400 |
| 6,820,104 | B2 * | 11/2004 | Pelton et al. | 708/400 |
| 6,876,704 | B2 * | 4/2005 | LaRocca et al. | 375/240.2 |
| 6,888,970 | B2 * | 5/2005 | Sandford | 382/302 |
| 6,895,120 | B2 * | 5/2005 | Satoh et al. | 382/240 |
| 7,096,245 | B2 * | 8/2006 | Hsiun et al. | 708/401 |
| 2002/0143834 | A1 * | 10/2002 | Sandford | 708/400 |
| 2002/0147752 | A1 * | 10/2002 | Todoroki et al. | 708/402 |
| 2003/0108248 | A1 * | 6/2003 | Huang et al. | 382/240 |

FOREIGN PATENT DOCUMENTS

| | | |
|---|---|---|
| JP | 06-046404 | 2/1994 |
| JP | 2001-103484 | 4/2001 |

OTHER PUBLICATIONS

JPEG 2000 Part I Final Committee Draft Version 1.0, ISO/IEC JTC1/SC29 WG1, JPEG 2000 Editor Martin Boliek, Coeditors Charilaos Christopoulos, and Eric Majani Mar. 16, 2000 p. 145.*

* cited by examiner

*Primary Examiner*—Jingge Wu
*Assistant Examiner*—Sean Motsinger
(74) *Attorney, Agent, or Firm*—Hayes Soloway P.C.

(57) ABSTRACT

An image processing apparatus supporting both discrete wavelet transform and discrete cosine transform with reduced hardware resources. The image processing apparatus is composed of an input unit receiving a plurality of pixel data, a controlling unit selecting a desired transform from among discrete wavelet transform and discrete cosine transform, and providing a plurality of coefficients depending on the desired transform, and a processing unit which processes the pixel data using the plurality of coefficients to achieve the desired transform.

6 Claims, 14 Drawing Sheets

Fig. 4

|  | α | β | γ | δ | ε |
|---|---|---|---|---|---|
| 9/7 (ENCODING) | W1/0 | -W0/W4 | -W3/-W2 | W5/-W6 | W7/W8 |
| 9/7 (DECODING) | 0/W1 | W0/-W4 | -W2/-W3 | -W5/W6 | W8/W7 |
| DCT (ENCODING) | D5/D6 | D1/D4 | D3/D2 | 0/D0 | 0/0 |
| DCT (DECODING) | D5/D6 | D1/D4 | D3/D2 | D0/0 | 0/0 |

Fig. 5

| CLK | 1 | 2 | 3 | 4 | 5 | 6 | 7 | 8 | 9 | 10 | 11 | 12 |
|---|---|---|---|---|---|---|---|---|---|---|---|---|
| FFinp | f0 | f1 | f2 | f3 | f4 | f5 | f6 | f7 | | | | |
| FF0 | | f0 | f1 | f2 | f3 | f4 | f5 | f6 | f7 | f7 | f7 | f7 |
| FF1 | | | f0 | f1 | f2 | f3 | f4 | f5 | f6 | f6 | f6 | f6 |
| FF2 | | | | f0 | f1 | f2 | f3 | f4 | f5 | f5 | f5 | f5 |
| FF3 | | | | | f0 | f1 | f2 | f3 | f4 | f4 | f4 | f4 |
| FF4 | | | | | | f0 | f1 | f2 | f3 | f3 | f3 | f3 |
| FF5 | | | | | | | f0 | f1 | f2 | f2 | f2 | f2 |
| FF6 | | | | | | | | f0 | f1 | f1 | f1 | f1 |
| FF7 | | | | | | | | | f0 | f0 | f0 | f0 |
| FF8 | | | | | | | | | | | | |
| m1 | | | | | | | | | * | * | * | * |
| m2 | | | | | | | | | * | * | * | * |
| FF9 | | | | | | | | | | * | * | * |
| FF14 | | | | | | | | | | | x0 | x0 |
| m3 | | | | | | | | | * | * | * | * |
| m4 | | | | | | | | | * | * | * | * |
| FF10 | | | | | | | | | | * | * | * |
| FF15 | | | | | | | | | | | x0 | x0 |
| m5 | | | | | | | | | f0 | f1 | f2 | f3 |
| m6 | | | | | | | | | f7 | f6 | f5 | f4 |
| FF11 | | | | | | | | | | f0+f7 | f1+f6 | f2+f5 |
| FF16 | | | | | | | | | | (f0+f7)xD3 | (f0+f7)xD3 | (f1+f6)xD3 |
| m7 | | | | | | | | | | * | * | * |
| m8 | | | | | | | | | | * | * | * |
| FF12 | | | | | | | | | | | * | * |
| FF17 | | | | | | | | | | | x0 | x0 |
| FF19 | | | | | | | | | | | | a0xD3 |
| FF20 | | | | | | | | | | | | |

Fig. 6

| | 13 | 14 | 15 | 16 | 17 | 18 | 19 | 20 |
|---|---|---|---|---|---|---|---|---|
| | f7 | f7 | f7 | f7 | f7 | f7 | f7 | f7 |
| | f6 | f6 | f6 | f6 | f6 | f6 | f6 | f6 |
| | f5 | f5 | f5 | f5 | f5 | f5 | f5 | f5 |
| | f4 | f4 | f4 | f4 | f4 | f4 | f4 | f4 |
| | f3 | f3 | f3 | f3 | f3 | f3 | f3 | f3 |
| | f2 | f2 | f2 | f2 | f2 | f2 | f2 | f2 |
| | f1 | f1 | f1 | f1 | f1 | f1 | f1 | f1 |
| | f0 | f0 | f0 | f0 | f0 | f0 | f0 | f0 |
| | * | * | * | * | f0 | f3 | f1 | f2 |
| | * | * | * | * | f7 | f4 | f6 | f5 |
| | * | f0+f7 | -f1-f6 | -f2-f5 | * | f0+f7 | -f3-f4 | -f1-f6 |
| | x0 | (f3+f4)xD3 | (f0+f7)xD3 | (-f1-f6)xD3 | x0 | x0 | (f0+f7)xD5 | (-f3-f4)xD5 |
| | * | * | * | * | f1 | f2 | f0 | f3 |
| | * | * | * | * | f6 | f5 | f7 | f4 |
| | x0 | x0 | x0 | f3+f4 | f3+f4 | f1+f6 | -f2-f5 | f0+f7 |
| | f0 | f1 | f2 | -f2-f5 | (-f2-f5)xD3 | x0 | (f1+f6)xD1 | (-f2-f5)xD1 |
| | f7 | f6 | f5 | f4 | * | * | * | * |
| | f3+f4 | * | * | * | * | * | * | * |
| | (f2+f5)xD3 | (f3+f4)xD3 | * | * | * | * | * | * |
| | * | * | * | * | * | * | * | * |
| | x0 | x0 | x0 | x0 | x0 | x0 | x0 | x0 |
| | (a0+a1)xD3 | (a0+a1+a2)xD3 | (a0+a1+a2+a3)xD3 | a0xD3 | (a0-a1)xD3 | (a0-a1+a2)xD3 | (a0-a1+a2-a3)xD3 | a0xD5+a1xD1 |
| | a0xD3 | (a0+a1)xD3 | (a0+a1+a2)xD3 | F0 | a0xD3 | (a0-a1)xD3 | (a0-a1-a2)xD3 | F4 |

Fig. 7

| | 21 | 22 | 23 | 24 | 25 | 26 | 27 | 28 |
|---|---|---|---|---|---|---|---|---|
| | f7 | f7 | f7 | f7 | | | | |
| | f6 | f6 | f6 | f6 | | | | |
| | f5 | f5 | f5 | f5 | | | | |
| | f4 | f4 | f4 | f4 | | | | |
| | f3 | f3 | f3 | f3 | | | | |
| | f2 | f2 | f2 | f2 | | | | |
| | f1 | f1 | f1 | f1 | | | | |
| | f0 | f0 | f0 | f0 | | | | |
| | f2+f5 | f0−f7 | −f2+f5 | −f1+f6 | −f3+f4 | | | |
| | (−f1−f6)xD5 | (f2+f5)xD5 | (f0−f7)xD6 | (−f2+f5)xD6 | (−f1+f6)xD6 | (−f3+f4)xD6 | | |
| | f1 | f0 | f3 | f2 | | | | |
| | f6 | f7 | f4 | f5 | | | | |
| | −f3−f4 | f1−f6 | (f1−f6)xD4 | f3−f4 | f2−f5 | (f2−f5)xD4 | | |
| | (f0+f7)xD1 | (−f3−f4)xD1 | (f1−f6)xD4 | (f0−f7)xD4 | (f3−f4)xD4 | | | |
| | f2 | f3 | f0 | f1 | −f1+f6 | −f1+f6 | | |
| | f5 | f4 | f7 | f6 | (f0−f7)xD2 | (−f1+f6)xD2 | | |
| | * | f2−f5 | −f3+f4 | −f3+f4 | f0−f7 | f0−f7 | | |
| | x0 | x0 | (f2−f5)xD2 | (−f3+f4)xD2 | (f2−f5)xD0 | (f0−f7)xD0 | | |
| | f3 | f1 | f2 | f0 | (f2−f5)xD0 | | | |
| | f4 | f6 | f5 | f7 | | | | |
| | * | f3−f4 | −f1+f6 | −f1+f6 | | | | |
| | x0 | x0 | (f3−f4)xD0 | (−f1+f6)xD0 | | | | |
| | (a0−a3)xD5 | −a1xD5 | (−a1+a2)xD5 | a4xD6+a5xD4 | −a6xD6+a4xD4 | −a5xD6+a6xD4 | −a7xD6+a6xD4 | |
| | +(a1−a2)xD1 | +a2xD1 | +(a0−a3)xD1 | +a6xD2+a7xD0 | −a7xD2−a5xD0 | +a4xD2−a5xD0 | −a5xD2+a4xD0 | |
| | F2 | F2 | F6 | F1 | F3 | F5 | F7 |

Fig. 8

| CLK | 1 | 2 | 3 | 4 | 5 | 6 | 7 | 8 | 9 | 10 | 11 | 12 |
|---|---|---|---|---|---|---|---|---|---|---|---|---|
| FFinp | F0 | F1 | F2 | F3 | F4 | F5 | F6 | F7 | F7 | F7 | F7 | F7 |
| FF0 | | F0 | F1 | F2 | F3 | F4 | F5 | F6 | F6 | F6 | F6 | F6 |
| FF1 | | | F0 | F1 | F2 | F3 | F4 | F5 | F5 | F5 | F5 | F5 |
| FF2 | | | | F0 | F1 | F2 | F3 | F4 | F4 | F4 | F4 | F4 |
| FF3 | | | | | F0 | F1 | F2 | F3 | F3 | F3 | F3 | F3 |
| FF4 | | | | | | F0 | F1 | F2 | F2 | F2 | F2 | F2 |
| FF5 | | | | | | | F0 | F1 | F1 | F1 | F1 | F1 |
| FF6 | | | | | | | | F0 | F0 | F0 | F0 | F0 |
| FF7 | | | | | | | | | | | | |
| FF8 | | | | | | | | | | | | |
| m1 | | | | | | | | | F2 | F1 | F2 | F1 |
| m2 | | | | | | | | | * | * | * | * |
| FF9 | | | | | | | | | | F2 | F1 | F2 |
| FF14 | | | | | | | | | | | F2xD5 | F1xD6 |
| m3 | | | | | | | | | F6 | F3 | F6 | F3 |
| m4 | | | | | | | | | * | * | * | * |
| FF10 | | | | | | | | | | F6 | F3 | F6 |
| FF15 | | | | | | | | | | | F6xD1 | F3xD4 |
| m5 | | | | | | | | | F0 | F5 | F0 | F5 |
| m6 | | | | | | | | | F4 | * | F4 | * |
| FF11 | | | | | | | | | | F0+F4 | F5 | F0+F4 |
| FF16 | | | | | | | | | | | (F0+F4)xD3 | F5xD2 |
| m7 | | | | | | | | | * | F7 | * | F7 |
| m8 | | | | | | | | | * | * | * | * |
| FF12 | | | | | | | | | | | F7 | * |
| FF17 | | | | | | | | | | | *xO | F7xD0 |
| FF19 | | | | | | | | | | | | (a0+a3)xD3+ a2xD5+a1xD1 |
| FF20 | | | | | | | | | | | | |

Fig. 9

| | 13 | 14 | 15 | 16 | 17 | 18 | 19 | 20 |
|---|---|---|---|---|---|---|---|---|
| | F7 | F7 | F7 | F7 | F7 | F7 | F7 | F7 |
| | F6 | F6 | F6 | F6 | F6 | F6 | F6 | F6 |
| | F5 | F5 | F5 | F5 | F5 | F5 | F5 | F5 |
| | F4 | F4 | F4 | F4 | F4 | F4 | F4 | F4 |
| | F3 | F3 | F3 | F3 | F3 | F3 | F3 | F3 |
| | F2 | F2 | F2 | F2 | F2 | F2 | F2 | F2 |
| | F1 | F1 | F1 | F1 | F1 | F1 | F1 | F1 |
| | F0 | F0 | F0 | F0 | F0 | F0 | F0 | F0 |
| | F6 | F5 | F6 | F5 | F6 | F3 | F6 | F3 |
| | * | * | * | * | -F5 | * | * | * |
| | F1 | -F6 | -F6xD5 | -F5xD6 | -F6xD5 | F6 | -F3 | F6 |
| | F2xD5 | F1xD6 | F2 | F1 | F2 | -F5xD6 | F6xD5 | -F3xD6 |
| | F2 | F1 | * | * | * | F7 | F2 | F7 |
| | * | * | F1 | F2 | F1 | * | F7 | * |
| | F3 | F2 | F2xD1 | F1xD4 | F2xD1 | -F2 | * | -F2 |
| | F6xD1 | F3xD4 | F0 | F7 | F0 | F1xD4 | -F2xD1 | F7xD4 |
| | F0 | F7 | F4 | * | F4 | F1 | F0 | F1 |
| | F4 | * | * | F0-F4 | F7 | * | F4 | * |
| | F5 | F0-F4 | -F7 | -F7xD2 | (F0-F4)xD3 | F0-F4 | F1 | F0-F4 |
| | (F0+F4)xD3 | F5xD2 | (F0-F4)xD3 | F3 | F3 | F7xD2 | (F0-F4)xD3 | F1xD2 |
| | * | F3 | * | * | * | F5 | * | F5 |
| | F7 | * | -F3 | * | -F3 | * | F5 | * |
| | *xD0 | F7xD0 | *xD0 | -F3xD0 | *xD0 | -F3xD0 | *xD0 | F5xD0 |
| | a5xD6+a7xD4- | (a0+a3)xD3+ | (a0+a3)xD3+a5xD6+a7xD4- | (a0-a3)xD3-a6xD6+a5xD4+ | (a0-a3)xD3- | (a0-a3)xD3- | a6xD6+a5xD4 | (a0-a3)xD3+ |
| | a6xD2-a4xD0 | a2xD5+a1xD1 | a6xD2-a4xD0 | a4xD2-a7xD0 | a1xD5+a2xD1 | a1xD5+a2xD1 | +a4xD2-a7xD0 | a1xD5-a2xD1 |
| | (a0+a3)xD3+ | f0※ | (a0+a3)xD3+ | f4※ | (a0-a3)xD3- | f1※ | (a0-a3)xD3 | f5※ |
| | a2xD5+a1xD1 | | a2xD5+a1xD1 | | a1xD5+a2xD1 | | -a1xD5+a2xD1 | |

Fig. 10

| | 21 | 22 | 23 | 24 | 25 | 26 | 27 | 28 | 29 |
|---|---|---|---|---|---|---|---|---|---|
| | F7 | F7 | F7 | F7 | F7 | F7 | F7 | F7 | F7 |
| | F6 | F6 | F6 | F6 | F6 | F6 | F6 | F6 | F6 |
| | F5 | F5 | F5 | F5 | F5 | F5 | F5 | F5 | F5 |
| | F4 | F4 | F4 | F4 | F4 | F4 | F4 | F4 | F4 |
| | F3 | F3 | F3 | F3 | F3 | F3 | F3 | F3 | F3 |
| | F2 | F2 | F2 | F2 | F2 | F2 | F2 | F2 | F2 |
| | F1 | F1 | F1 | F1 | F1 | F1 | F1 | F1 | F1 |
| | F0 | F0 | F0 | F0 | F0 | F0 | F0 | F0 | F0 |
| | F2 | F2 | F2 | F7 | −F7 | | | | |
| | * | * | * | * | | | | | |
| | −F3 | −F2 | −F7 | −F2 | −F2×D5 | −F7×D6 | | | |
| | F6×D5 | −F3×D6 | −F2×D5 | −F7×D6 | | | | | |
| | F6 | F5 | F6 | F5 | F5 | | | | |
| | * | * | * | * | | | | | |
| | F7 | −F6 | F5 | −F6 | −F6×D1 | F5×D4 | | | |
| | −F2×D1 | F7×D4 | −F6×D1 | F5×D4 | | | | | |
| | F0 | F3 | F0 | F3 | | | | | |
| | F4 | * | F4 | * | | | | | |
| | F1 | F0+F4 | −F3 | F0+F4 | −F3 | −F3×D2 | | | |
| | (F0−F4)×D3 | F1×D2 | (F0+F4)×D3 | −F3×D2 | (F0+F4)×D3 | | | | |
| | * | F1 | * | F1 | F1 | | | | |
| | * | * | * | * | | | | | |
| | F5 | F5×D0 | F1 | * | F1×D0 | F1×D0 | | | |
| | *×0 | f2※ | *×0 | f6※ | | f3※ | | | f7※ |
| | −a7×D6−a4×D4 | (a0−a3)×D3+ | (a0−a3)×D3+ | (a0+a3)×D3 | (a0+a3)×D3 | (a0+a3)×D3 | a4×D6−a6×D4 | | |
| | +a5×D2−a6×D0 | a1×D5−a2×D1 | −a7×D2−a6×D0 | −a2×D5−a1×D1 | −a2×D5−a1×D1 | −a2×D5−a1×D1 | −a7×D2+a5×D0 | | |
| | (a0−a3)×D3+ | | | | a4×D6−a6×D4 | | (a0+a3)×D3 | | |
| | a1×D5−a2×D1 | | | | −a7×D2+a5×D0 | | −a2×D5−a1×D1 | | |

Fig. 12

ENCODING PROCEDURE

| CLK | 1 | 2 | 3 | 4 | 5 | 6 | 7 | 8 | 9 | 10 |
|---|---|---|---|---|---|---|---|---|---|---|
| FFinp | 2n−1 | 2n | 2n+1 | 2n+2 | 2n+3 | 2n+4 | 2n+5 | 2n+6 | 2n+7 | 2n+8 |
| FF0 | [2n−2] | 2n−1 | 2n | 2n+1 | [2n+2] | 2n+3 | [2n+4] | 2n+5 | [2n+6] | 2n+7 |
| FF1 | 2n−3 | 2n−2 | 2n−1 | 2n | 2n+1 | 2n+2 | 2n+3 | 2n+4 | 2n+5 | 2n+6 |
| FF2 | [2n−4] | 2n−3 | [2n−2] | 2n−1 | 2n | 2n+1 | 2n+2 | 2n+3 | [2n+4] | 2n+5 |
| FF6 | 2n−8 | 2n−7 | 2n−6 | 2n−5 | 2n−4 | 2n−3 | 2n−2 | 2n−1 | 2n | |
| FF9 | [2n−8]* | [2n−3]* | [2n−6]* | [2n−1]* | [2n−4]* | [2n+1]* | [2n−2]* | [2n+3]* | | |
| FF10 | [2n−5] | [2n−8] | [2n−3] | [2n−6] | [2n−1] | [2n−4] | [2n+1] | [2n−2] | [2n+3] | |
| FF15 | [2n−7] | [2n−5] | [2n−5] | [2n−3] | [2n−3] | [2n−1] | [2n−1] | [2n+1] | [2n+1] | |
| FF14 | [2n−9] | [2n−7] | [2n−7] | [2n−5] | [2n−5] | [2n−3] | [2n−3] | [2n−1] | [2n−1] | |

TIME →

Fig. 13

DECODING PROCEDURE

| CLK | 1 | 2 | 3 | 4 | 5 | 6 | 7 | 8 | 9 | 10 |
|---|---|---|---|---|---|---|---|---|---|---|
| FFinp | 2n−1 | 2n | 2n+1 | 2n+2 | 2n+3 | 2n+4 | 2n+5 | 2n+6 | 2n+7 | 2n+8 |
| FF0 | 2n−2 | [2n−1] | 2n | [2n+1] | 2n+2 | [2n+3] | 2n+4 | [2n+5] | 2n+6 | [2n+7] |
| FF1 | 2n−3 | [2n−2] | 2n | 2n | 2n+1 | [2n+2] | 2n+3 | [2n+4] | 2n+5 | [2n+6] |
| FF2 | 2n−4 | [2n−3] | 2n−2 | [2n−1] | 2n | [2n+1] | 2n+2 | [2n+3] | 2n+4 | [2n+5] |
| FF6 | 2n−8 | 2n−7 | 2n−6 | 2n−5 | 2n−4 | 2n−3 | 2n−2 | 2n−1 | 2n | |
| FF9 | [2n−4]* | [2n−7]* | [2n−2]* | [2n−5]* | [2n]* | [2n−3]* | [2n+2]* | [2n−1]* | [2n+4]* | |
| FF10 | [2n−9] | [2n−4] | [2n−7] | [2n−2] | [2n−5] | [2n] | [2n−3] | [2n+2] | [2n−1] | |
| FF15 | [2n−6] | [2n−4] | [2n−4] | [2n−2] | [2n−2] | [2n] | [2n] | [2n+2] | | |
| FF14 | [2n−8] | [2n−6] | [2n−6] | [2n−4] | [2n−4] | [2n−2] | [2n−2] | [2n] | | |

→ TIME

IMAGE PROCESSING APPARATUS SUPPORTING BOTH DISCRETE COSINE TRANSFORM AND DISCRETE WAVELET TRANSFORM

BACKGROUND OF THE INVENTION

1. Field of the Invention

The present invention is related to an apparatus and method for image processing, in particular, to an image processor adaptive to a plurality of coding and decoding procedures.

2. Description of the Related Art

The JPEG (Joint Photographic Expert Group) algorithm, which uses a discrete cosine transform (DCT), is one of the most common static image compressing methods. The JPEG algorithm achieves high compression with reduced image deterioration, and thereby allows personal computers and facsimiles to process image data with reduced hardware resources.

The JPEG algorithm, however, suffers from several drawbacks, including image deterioration at low bit rates.

In order to overcome these drawbacks, JPEG 2000 algorithm has been recently standardized and become commercially available. The JPEG 2000 algorithm employs a discrete wavelet transform (DWT) to code and decode image data in place of the discrete cosine transform.

This situation requires image processing apparatuses to support both of the conventional JPEG and JPEG 2000 algorithms. Japanese Unexamined Patent Application No. 2001-103484 discloses an image processing apparatus selectively performing the DCT and DWT to be adaptive to the conventional JPEG and JPEG 2000 algorithms. FIG. 1 shows a block diagram of the disclosed image processing apparatus. The disclosed image processing apparatus is composed of an input selector 50, a DCT processor 51, a DWT processor 52, and an output selector 53. The input selector 50 selects one of the DCT processor 51, the DWT processor 52 in response to a selection signal received from a circuit, and transfers input data to the selected processor. The DCT processor 51 encodes the data received from the input selector 50 using the discrete cosine transform, while the DWT processor 52 encodes the data received from the input selector 50 using the discrete wavelet transform. The output selector 53 outputs the encoded data in response to the selector signal.

Japanese Unexamined Patent Application No. H06-46404 discloses an image data processing apparatus for reducing image derogation in image edges. This image data processing apparatus detects image edges in units of image blocks, and encodes the image block(s) including the detected image edge(s) using the wavelet transform in place of the discrete cosine transform.

An issue of the conventional image processing apparatuses is that they requires large hardware resources to support both the DCT and DWT algorithms.

A need exists to provide an image processing apparatus which supports both the DCT and DWT algorithms with reduced hardware resources.

SUMMARY OF THE INVENTION

Therefore, an object of the present invention is to provide an image processing apparatus which supports both the DCT and DWT algorithms with reduced hardware resources.

In an aspect of the present invention, an image processing apparatus is composed of an input unit receiving a plurality of pixel data, a controlling unit selecting a desired transform from among discrete wavelet transform and discrete cosine transform, and providing a plurality of coefficients depending on the desired transform, and a processing unit which processes the pixel data using the plurality of coefficients to achieve the desired transform.

The input unit preferably includes a storage unit storing the pixel data, and a rearrangement unit receiving and rearranging the pixel data so as to be adaptive to the desired transform in response to a control signal received from the control unit. The processing unit processes the rearranged pixel data to achieve the desired transform.

The processing unit preferably includes a plurality of adders, a plurality of multipliers, and an adder/subtractor unit. Each of the plurality of adders calculates a sum of two of the rearranged pixel data, the two of the rearranged pixel data being selected by the rearranged unit. Each of the plurality of multipliers calculates a product of associated one of the sums and associated one of the plurality of the coefficients. The adder/subtractor unit executes operation on the products received from the plurality of multipliers to obtain a result data of the desired transform.

It is advantageous if the controlling unit selects one procedure from among encoding and decoding through the desired transform, and develops the plurality of coefficients depending on the selected procedure.

It is also advantageous if the controlling unit selects one procedure from among encoding and decoding through the desired transform, and develops the control signal to allow the rearrangement unit to be adaptive to the selected procedure.

Preferably, the controlling unit selects one of an irreversible 9/7 filter and a reversible 5/3 filter to be used when selecting the discrete wavelet transform, and develops the plurality of coefficients depending on the selected filter.

It is also preferable that the controlling unit selects one of an irreversible 9/7 filter and a reversible 5/3 filter to be used when selecting the discrete wavelet transform, and develops the control signal to allow the rearrangement unit to be adaptive to the selected procedure.

The input unit may include a plurality of flipflops which respectively stores therein one of the plurality of pixel data, a rearrangement unit receiving the plurality of pixel data from the plurality of flipflops and rearranging the received pixel data so as to be adaptive to the desired transform in response to a control signal received from the control unit, and the processing unit may includes a plurality of adders, each receiving two of the plurality of pixel data selected by the rearrangement unit to calculate a sum of the received two pixel data, a plurality of multipliers, each calculating a product of associated one of the sums and associated one of the plurality of the coefficients, another multiplier receiving one of the plurality of pixel data from one of the flipflops and calculating a product of the received pixel data and associated one of the plurality of the coefficients, a selector; and an adder/subtractor unit, the selector selecting one of outputs of the another multiplier and the adder/subtractor unit, and the adder/subtractor unit executing operation on the products received from the plurality of multipliers and an output of the selector to obtain a result data of the desired transform.

In another aspect of the present invention, an image processing method is composed of:

receiving a plurality of pixel data;

selecting a desired transform from among discrete wavelet transform and discrete cosine transform;

providing a plurality of coefficients depending on the desired transform; and processing the pixel data using the set of coefficients to achieve the desired transform.

The image processing method preferable further includes:

rearranging the pixel data so as to be adaptive to the desired transform, wherein the processing is executed with respect to the rearranged pixel data to achieve the desired transform.

the processing preferably includes:

providing pixel data pairs each including two of the rearranged pixel data, calculating sums of respective pixel data pairs, calculating products of the sums and the plurality of coefficients;

executing operation on the products to obtain a result data of the desired transform.

The image processing method preferably includes:

selecting one procedure from among encoding and decoding through the desired transform, wherein the plurality of coefficients are developed depending on the selected procedure.

The image processing method preferably includes:

selecting one procedure from among encoding and decoding through the desired transform, the rearranging the pixel data being executed depending on the selected desired procedure.

The image processing method preferably includes:

selecting one of an irreversible 9/7 filter and a reversible 5/3 filter to be used when selecting the discrete wavelet transform, the plurality of coefficients being developed depending on the selected filter.

The image processing method preferably includes:

selecting one of an irreversible 9/7 filter and a reversible 5/3 filter to be used when selecting the discrete wavelet transform, the rearranging being executed depending on the selected procedure.

BRIEF DESCRIPTION OF THE DRAWINGS

FIG. 4 is a table illustrating a set of coefficients provided for the multiplier unit 23 from the controller unit 30;

FIGS. 5 to 7 are timing diagrams illustrating encoding through the discrete cosine transform;

FIGS. 8 to 10 are timing diagrams illustrating decoding through the discrete cosine transform;

FIG. 12 is a timing diagram illustrating encoding through discrete wavelet transform using a reversible 5/3 filter in the second embodiment;

FIG. 13 is a timing diagram illustrating decoding through discrete wavelet transform using a reversible 5/3 filter in the second embodiment.

DESCRIPTION OF THE PREFERRED EMBODIMENTS

Figure 1:
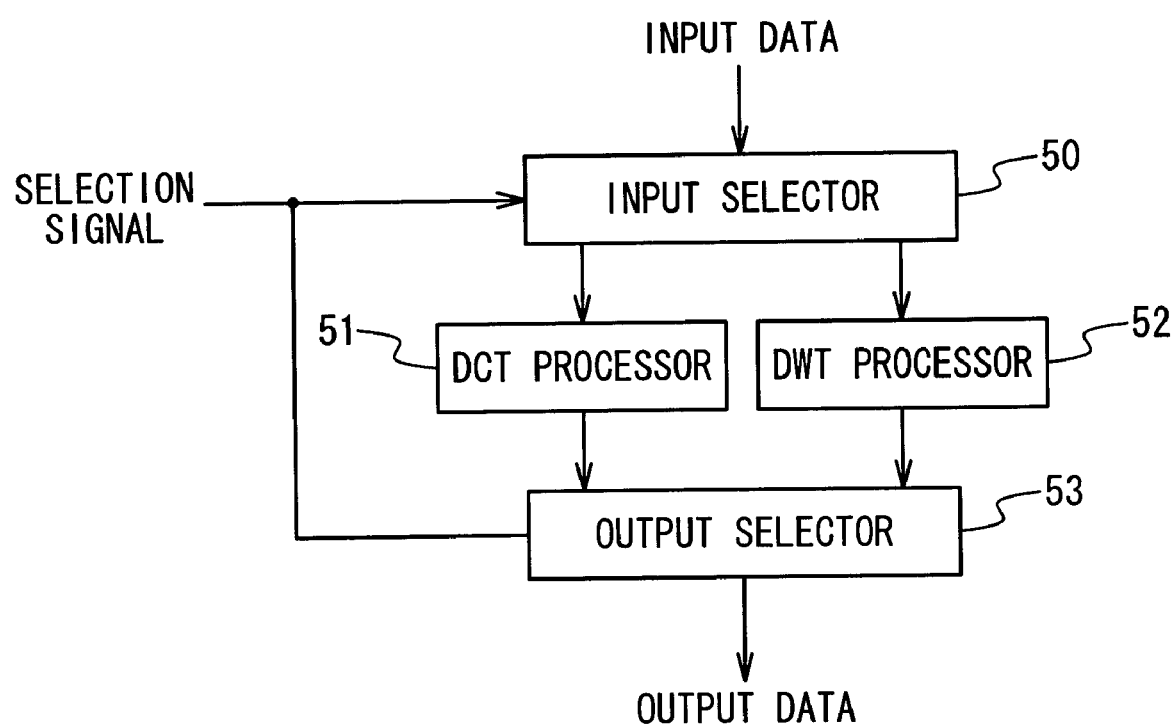
FIG. 1 is a block diagram of a conventional image processing apparatus.

Preferred embodiments of the present invention are described below in detail with reference to the attached drawings.

DWT and DCT Algorithms

An image processing apparatus in accordance with the present invention encodes and decodes image data using discrete wavelet transform and discrete cosine transform. Below is an explanation of the discrete wavelet transform and the discrete cosine transform used in this embodiment.

The image processing apparatus is adapted to discrete wavelet transform using an irreversible 9/7 filter and/or a reversible 5/3 filter described in the following.

The DCT algorithm using the irreversible 9/7 filter is characterized in that the coefficients of the filter are real numbers and that the DWT algorithm fails to perform rounding of the encoded and decoded image data.

The DCT algorithm using the irreversible 9/7 filter encodes pixel data of even numbered columns of pixels in the image in accordance with the following equation (1):

$$Y(2n)=W1*(X(2n-4)+X(2n+4))-W0*(X(2n-3)+X(2n+3))-W3*(X(2n-2)+X(2n+2))+W5*(X(2n-1)+X(2n+1))+W7*X(2n), \quad (1)$$

where X(i) is an original pixel data, and Y(i) is an encoded pixel data, while encoding pixel data of odd numbered columns in accordance with the following equation (2):

$$Y(2n+1)=W4*(X(2n-2)+X(2n+4))-W2*(X(2n-1)+X(2n+3))-W6*(X(2n)+X(2n+2))+W8*X(2n+1) \quad (2)$$

where W0 through W7 are filter coefficients of the irreversible 9/7 filter given in the following:

W0=0.0168641184 . . . ,
W1=0.0267487574 . . . ,
W2=0.0575435262 . . . ,
W3=0.0782232665 . . . ,
W4=0.0912717631 . . . ,
W5=0.2668641184 . . . ,
W6=0.5912717631 . . . ,
W7=0.6029490182 . . . , and
W8=1.1150870524 . . .

The DWT algorithm using the irreversible 9/7 filter, on the other hand, decodes pixel data of the even numbered columns of the pixels in accordance with the following equation (3):

$$X(2n)=W0*(Y(2n-3)+Y(2n+3))-W2*(Y(2n-2)+Y(2n+2))-W5*(Y(2n-1)+Y(2n+1))+W8*Y(2n), \quad (3)$$

while decoding pixel data of the odd numbered columns in accordance with the following equation (4):

$$X(2n+1)=W1*(Y(2n-3)+Y(2n+5))-W4*(Y(2n-2)+Y(2n+4))-W3*(Y(2n-1)+Y(2n+3))+W6*(Y(2n)+Y(2n+2))+W7*Y(2n+1) \quad (4)$$

where W0 through W7 are the above-described filter coefficients.

The DWT algorithm using the reversible 5/3 filter, on the other hand, is characterized in that the coefficients of the filter are integers and that the DWT algorithm performs rounding of the encoded and decoded image data to integerize.

The DWT algorithm using the reversible 5/3 filter encodes pixel data of even numbered columns of pixels in the image in accordance with the following equation (5):

$$Y(2n+1) = X(2n+1) - \left[\frac{X(2n) + X(2n+2)}{2}\right], \quad (5)$$

while encoding pixel data of odd numbered columns of pixels in accordance with the following equation (6):

$$Y(2n) = X(2n) - \left[\frac{Y(2n-1) + Y(2n+1) + 2}{4}\right], \quad (6)$$

where [x] is the floor function defined as follows: for a real number x, [x] is the largest integer less than or equal to x, The DWT algorithm using the reversible 5/3 filter, on the other hand, decodes pixel data of the even numbered columns of pixels in accordance with the following equation (7):

$$X(2n) = Y(2n) - \left[\frac{Y(2n-1) + Y(2n+1) + 2}{4}\right], \quad (7)$$

while decoding pixel data of the odd numbered columns of pixels in accordance with the following equation (8):

$$X(2n+1) = Y(2n+1) - \left[\frac{X(2n) + X(2n+2)}{2}\right]. \quad (8)$$

The image processing apparatus also performs a DCT algorithm described in the following. The DCT algorithm encodes pixel data of even numbered columns of pixels in accordance with the following equation (9):

$$\begin{bmatrix} F0 \\ F4 \\ F2 \\ F6 \end{bmatrix} = \begin{bmatrix} a0+a1+a3+a2 & 0 & 0 \\ a0-a1+a3-a2 & 0 & 0 \\ 0 & a0-a3 & a1-a2 \\ 0 & -a1+a2 & a0-a3 \end{bmatrix} \begin{bmatrix} D3 \\ D5 \\ D1 \end{bmatrix}, \quad (9)$$

while encoding pixel data of odd numbered columns of pixels in accordance with the following equation (10):

$$\begin{bmatrix} F1 \\ F3 \\ F5 \\ F7 \end{bmatrix} = \begin{bmatrix} a4 & a5 & a6 & a7 \\ -a6 & a4 & -a7 & -a5 \\ -a5 & a7 & a4 & a6 \\ -a7 & a6 & -a5 & a4 \end{bmatrix} \begin{bmatrix} D6 \\ D4 \\ D2 \\ D0 \end{bmatrix}, \quad (10)$$

where F0 through F7 are encoded pixel data, D0 through D6 are filter coefficients defined as follows:
D0=0.19509032,
D1=0.38268343,
D2=0.55557023,
D3=0.70710678,
D4=0.83146961,
D5=0.92387953, and
D6=0.98078528, and a0 through a7 are coefficients defined as follows:

$a0=f0+f7$, $a1=f1+f6$, $a2=f2+f5$, $a3=f3+f4$, $a4=f0-f7$, $a5=f1-f6$, $a6=f2-f5$, and $a7=f3-f4$, \quad (11)

where f0 through f7 are original pixel data.

The DCT algorithm decodes pixel data of the even numbered columns of pixels in accordance with the following equations (12) and (13):

$$\frac{1}{2}\begin{bmatrix} f0+f4 \\ f1+f5 \\ f2+f6 \\ f3+f7 \end{bmatrix} = \begin{bmatrix} a0+a3 & a2 & a1 \\ a0-a3 & -a1 & -a2 \\ a0-a3 & a1 & -a2 \\ a0+a3 & -a2 & -a1 \end{bmatrix} \begin{bmatrix} D3 \\ D5 \\ D1 \end{bmatrix}, \text{ and} \quad (12)$$

$$\frac{1}{2}\begin{bmatrix} f0-f4 \\ f1-f5 \\ f2-f6 \\ f3-f7 \end{bmatrix} = \begin{bmatrix} a5 & a7 & -a6 & -a4 \\ a6 & a5 & a4 & -a7 \\ -a7 & -a4 & a5 & -a6 \\ a4 & -a6 & -a7 & a5 \end{bmatrix} \begin{bmatrix} D6 \\ D4 \\ D2 \\ D0 \end{bmatrix}, \quad (13)$$

where a0 through a7 are coefficients defined as follows:

$a0=F0$, $a1=F6$, $a2=F2$, $a3=F4$, $a4=-F7$, $a5=F1$, $a6=-F5$, and $a7=F3$. \quad (14)

First Embodiment

Figure 2:
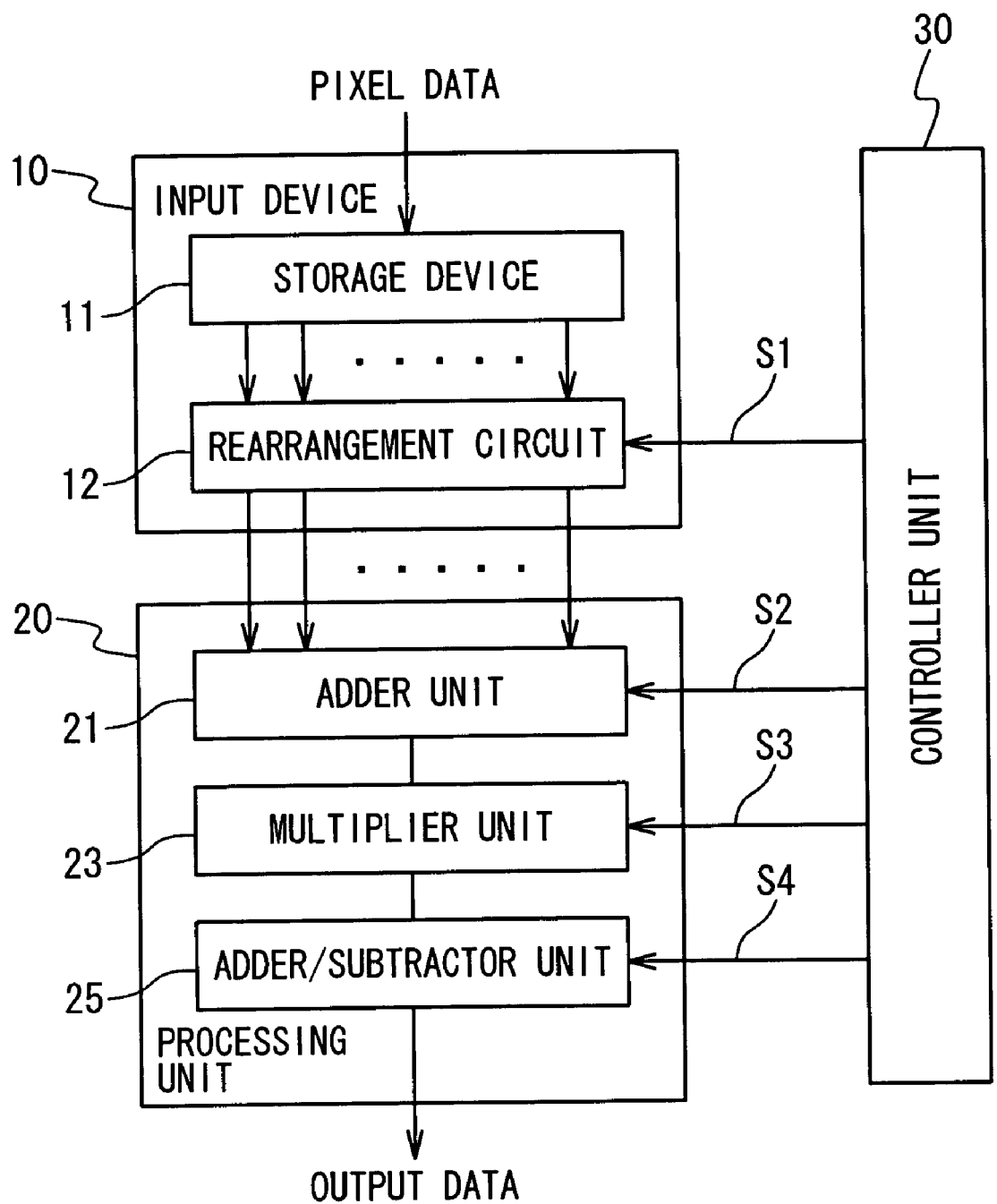
FIG. 2 is a block diagram of an image processing apparatus in a first embodiment of the present invention.

FIG. 2 shows a block diagram of an image processing apparatus in a first embodiment. The image processing apparatus in this embodiment is designed to support both discrete cosine transform and discrete wavelet transform using an irreversible 9/7 filter.

The image processing unit in this embodiment, is composed of an input unit 10, a processing unit 20, and a controller unit 30, which are monolithically integrated within an LSI (large scale integrated circuit).

The input unit 10 includes a storage unit 11 and a rearranging circuit 12. The storage unit 11 stores therein pixel data received from an external device. The storage unit 11 transfers the stored pixel data to the rearranging circuit 12. As described below, the storage unit 11 is composed of a shift register.

The rearranging circuit 12 rearranges the order of the pixel data received from the storage unit 11 so that the order of the pixel data is adaptive to the discrete wavelet transform or the discrete cosine transform in response to a control signal received from the controller unit 30. The rearranging circuit 12 defines pixel data pairs, which are different two of the pixel data. The rearranged pixel data is transferred to the processing unit 20.

The processing unit 20 is composed of an adder unit 21, a multiplier unit 22, and an adder/subtractor unit 23. The adder unit 21 calculates sums of the respective pixel data pairs or differences between the respective pixel data pairs, in response to a control signal S2 received from the controller unit 30. For the discrete wavelet transform in accordance with the equation (1), for example, the adder unit 21 calculates the sums a1 to a4 in parallel as follows:

$$a1 = X(2n-4) + X(2n+4),$$

$$a2 = X(2n-3) + X(2n+3),$$

$$a3 = X(2n-2) + X(2n+2), \text{ and}$$

$$a4 = X(2n-1) + X(2n+1).$$

The calculated sums are transferred to the multiplier unit 23.

The multiplier unit 23 receives a control signal S2 representative of filter coefficients from the controller unit 30, and calculates respective products of the sums received from the adder unit 21 and the associated filter coefficients received from the controller unit 30. For the discrete wavelet transform in accordance with the equation (1), for example, the multiplier unit 23 calculates the products MPY1 to MPY5 in parallel as follows:

$$MPY1 = W1 \times a1,$$

$$MPY2 = W0 \times a2,$$

$$MPY3 = W3 \times a3,$$

$$MPY4 = W5 \times a4, \text{ and}$$

$$MPY5 = W7 \times X(2n).$$

The calculated products are transferred to the adder/subtractor unit 25.

The adder/subtractor unit 25 is responsive to a control signal S3 received from the controller unit 30 for calculating addition and/or subtraction with respect to the products MPY1 to MPY5, and thereby obtains the encoded or decoded pixel data. For the discrete wavelet transform in accordance with the equation (1), for example, the adder/subtractor unit 25 calculates the encoded pixel data Y(2n) defined by the following equation:

$$Y(2n) = MPY1 - MPY2 - MPY3 + MPY4 + MPY5.$$

The same goes for the equations (2) to (4) and the equations (9), (10), (12) and (13).

The controller unit 30 provides the control signals S1 for the input unit 10 and the control signals S2 to S4 for the processing unit 20. The controller unit 30 determines which operation is to be performed, and indicate the input unit 10 and the processing unit 20 to perform the determined operation by providing the control signals S1 to S4. The determined operation includes: encoding and decoding through the discrete wavelet transform using the irreversible 9/7 filter, and encoding and decoding through the discrete cosine transform.

Figure 3:
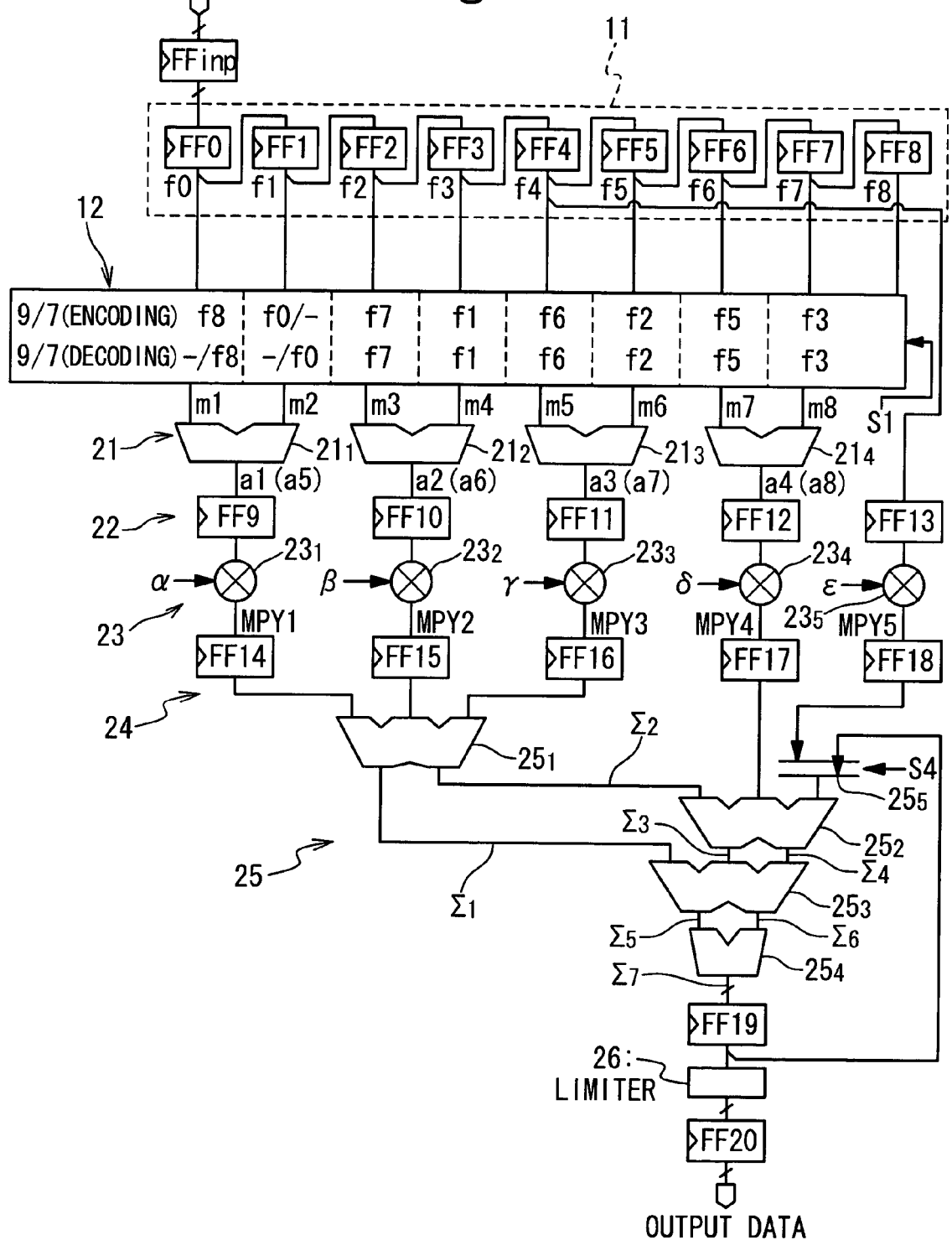
FIG. 3 is a detailed block diagram of the image processing apparatus in the first embodiment.

FIG. 3 shows a detailed block diagram of the processing apparatus in this embodiment. The processing unit 20 includes latches 22 and 24, a flipflop FF19, a limiter 26, and a flipflop 20 in addition to the adder unit 21, the multiplier unit 23, and the adder/subtractor unit 25.

The storage device 11 is composed of a flipflop $FF_{inp}$ and a set of flipflops FF0 through FF8. The flipflops FF0 to FF8 are provided to store pixel data f0 to f8. The pixel data f4 is associated with the pixel of interest of the discrete wavelet transform, and the pixel data f0 to f3, and f5 to f8 are associated with the pixels adjacent to the pixel of interest.

The flipflop $FF_{inp}$ functions as a buffer receiving the pixel data to be encoded or decoded. The output of the flipflop $FF_{inp}$ is connected to the input of the flipflop FF0. The flipflops FF0 through FF8 are connected in serial to constitute a shift register. The flipflop $FF_{inp}$ and flipflops FF0 through FF8 receives the same clock signal (not shown) and operates in synchronization with the clock signal. The received pixel data is transferred through the flipflops FF0 and FF8 in response to the clock signal. In an alternative embodiment, the flipflops FF0 and FF8 may directly receive the pixel data in parallel. The outputs of the respective flipflops FF0 to FF8 are connected to the rearrangement circuit 12.

The rearrangement circuit 12 rearranges the order of the pixel data f0 to f8 as indicated by the control signal S1 from the controller unit 30 to provide a set of pixel data m1 to m8. The rearrangement of the pixel data f0 to f8 depends on which transform is to be performed.

The row indicated by the symbol "9/7 encoding" represents which pixel data are outputted as the respective pixel data m1 to m8 for the encoding through the discrete wavelet transform using the irreversible 9/7 filter. The rearrangement of the pixel data is executed depending on whether the pixel of interest is positioned in the even numbered columns or in the odd numbered columns. In detail, the rearrangement circuit 12 outputs the pixel data f8 as the pixel data m1, regardless of the position of the pixel of interest. The rearrangement circuit 12 outputs the pixel data f0 as the pixel data m2 in the event that the pixel of interest is positioned in the even numbered column; otherwise the rearrangement circuit 12 outputs zero as the pixel data m2. The rearrangement circuit 12 outputs the pixel data f7, f1, f6, f2, f5 and f3 as the pixel data m3, m4, m5, m6, m7, and m8, respectively, regardless of the position of the pixel of interest.

Correspondingly, the row indicated by the symbol "9/7 decoding" represents which pixel data are outputted for the decoding through the discrete wavelet transform using the irreversible 9/7 filter. The rearrangement circuit 12 outputs zero as the pixel data m1 in the event that the pixel of interest is positioned in the even numbered column; otherwise, the rearrangement circuit 12 outputs the pixel data f8 as the pixel data m1. The rearrangement circuit 12 outputs zero as the pixel data m2 in the event that the pixel of interest is positioned in the even numbered column; otherwise the rearrangement circuit 12 outputs the pixel data f0 as the pixel data m2. And, the rearrangement circuit 12 outputs the pixel data f7, f1, f6, f2, f5 and f3 as the pixel data m3, m4, m5, m6, m7, and m8, respectively, regardless of the position of the pixel of interest.

The adder unit 21 is composed of a set of adders $21_1$ to $21_4$. The adder $21_1$ calculates the sum of the pixel data m1 and m2. The sum of the pixel data m1 and m2 is denoted by the numeral "a1" or "a5". Correspondingly, the adder $21_2$, $21_3$, and $21_4$ calculate the sum of the pixel data m3 and m4, the sum of the pixel data m5 and m6, and the sum of the pixel data m7 and m8, respectively. The sum of the pixel data m3 and m4 is denoted by the numeral "a2" or "a6", the sum of the pixel data m5 and m6 is denoted by the numeral "a3" or "a7", and the sum of the pixel data m7 and m8 is denoted by the numeral "a4" or "a8". The calculated sums a1 through a8 are transferred to the latch 22.

The latch 22 is composed of a set of flipflops FF9 and FF13. The flipflop FF9 latches the sum a1 (or a5) received from the adder $21_1$ and transfers the latched sum a1 (or a5) to the multiplier unit 23. The flipflop FF10 latches the sum a2 (or a6) received from the adder $21_2$, and transfers the latched sum a2 (or a6) to the multiplier unit 23. The flipflop FF11 latches the sum a3 (or a7) received from the adder $21_3$, and transfers the latched sum a3 (or a7) to the multiplier unit 23. The flipflop FF12 latches the sum a4 (or a8) received from the adder $21_4$, and transfers the latched sum a4 (or a8) to the multiplier unit 23. The flipflop FF13 latches the pixel data f4 from the flipflop FF4, and transfers the latched pixel data to the multiplier unit 23.

The multiplier 23 is composed of a set of multipliers $23_1$ to $23_5$. The multiplier $23_1$ calculate a product MPY1 of the sum a1 (or a5) received from the flipflop FF9 and a coefficient $\alpha$ described in the control signal S3 from the controller unit 30. The product MPY1 is transferred to the latch 24. Correspondingly, the multiplier $23_2$ calculate a product MPY2 of the sum a2 (or a6) received from the flipflop FF10 and a coefficient $\beta$ described in the control signal S3 from the controller unit 30. The product MPY2 is transferred to the latch 24. The multiplier $23_3$ calculate a product MPY3 of the sum a3 (or a7) received from the flipflop FF11 and a coefficient $\gamma$ described in the control signal S3 from the controller unit 30. The product MPY3 is transferred to the latch 24. The multiplier $23_4$ calculate a product MPY3 of the sum a4 (or a8) received from the flipflop FF12 and a coefficient $\delta$ described in the control signal S3 from the controller unit 30. The product MPY4 is transferred to the latch 24. And the multiplier $23_5$ calculate a product MPY5 of the pixel data f4 received from the flipflop FF13 and a coefficient $\epsilon$ described in the control signal S3 from the controller unit 30. The product MPY5 is transferred to the latch 24.

As shown in FIG. 4, the coefficient $\alpha$ depends on the kind of the transfer to be performed as described in the following. For encoding through the discrete wavelet transform using the irreversible 9/7 filter, the coefficient a is set to the aforementioned coefficient W1 in the event that the pixel of interest is positioned in the event numbered columns, while set to zero (0) in the event that the pixel of interest is positioned in the odd numbered columns. For decoding through the discrete wavelet transform using the irreversible 9/7 filter, the coefficient $\alpha$ is set to zero in the event that the pixel of interest is positioned in the even numbered columns, while set to W1 in the event that the pixel of interest is positioned in the odd numbered columns. For both encoding and decoding through the discrete cosine transform, the coefficient $\alpha$ is set to D0 in the event that the pixel of interest is positioned in the even numbered columns, while set to D5 in the event that the pixel of interest is positioned in the odd numbered columns.

Correspondingly, the coefficients $\beta$ through $\epsilon$ depend on the kind of the transfer to be performed as described in the following. For encoding through the discrete wavelet transform using the irreversible 9/7 filter, the coefficient $\beta$ is set to −W0 in the event that the pixel of interest is positioned in the even numbered columns, while set to W4 in the event that the pixel of interest is positioned in the odd numbered columns. For decoding through the discrete wavelet transform using the irreversible 9/7 filter, the coefficient $\beta$ is set to W0 in the event that the pixel of interest is positioned in the even numbered columns, while set to −W4 in the event that the pixel of interest is positioned in the odd numbered columns. For both encoding and decoding through the discrete cosine transform, the coefficient $\beta$ is set to D1 in the event that the pixel of interest is positioned in the even numbered columns, while set to D4 in the event that the pixel of interest is positioned in the odd numbered columns.

For encoding through the discrete wavelet transform using the irreversible 9/7 filter, the coefficient $\gamma$ is set to −W3 in the event that the pixel of interest is positioned in the even numbered columns, while set to −W2 in the event that the pixel of interest is positioned in the odd numbered columns. For decoding through the discrete wavelet transform using the irreversible 9/7 filter, the coefficient $\gamma$ is set to −W3 in the event that the pixel of interest is positioned in the even numbered columns, while set to −W2 in the event that the pixel of interest is positioned in the odd numbered columns. For both encoding and decoding through the discrete cosine transform, the coefficient $\gamma$ is set to D3 in the event that the pixel of interest is positioned in the even numbered columns, while set to D2 in the event that the pixel of interest is positioned in the odd numbered columns.

For encoding through the discrete wavelet transform using the irreversible 9/7 filter, the coefficient $\delta$ is set to W5 in the event that the pixel of interest is positioned in the even numbered columns, while set to −W6 in the event that the pixel of interest is positioned in the odd numbered columns. For decoding through the discrete wavelet transform using the irreversible 9/7 filter, the coefficient $\delta$ is set to −W5 in the event that the pixel of interest is positioned in the even numbered columns, while set to W6 in the event that the pixel of interest is positioned in the odd numbered columns. For both encoding and decoding through the discrete cosine transform, the coefficient $\delta$ is set to zero in the event that the pixel of interest is positioned in the even numbered columns, while set to D0 in the event that the pixel of interest is positioned in the odd numbered columns.

For encoding through the discrete wavelet transform using the irreversible 9/7 filter, the coefficient $\epsilon$ is set to W7 in the event that the pixel of interest is positioned in the even numbered columns, while set to W8 in the event that the pixel of interest is positioned in the odd numbered columns. For decoding through the discrete wavelet transform using the irreversible 9/7 filter, the coefficient $\epsilon$ is set to W8 in the event that the pixel of interest is positioned in the even numbered columns, while set to W7 in the event that the pixel of interest is positioned in the odd numbered columns. For both encoding and decoding through the discrete cosine transform, the coefficient $\epsilon$ is set to zero regardless of the position of the pixel of interest.

The latch 24 is composed of a set of flipflops FF14 through FF18. The flipflop FF14 latches the product MPY1 from the multiplier $24_1$, and transfers the latched product MPY1 to the adder/subtractor unit 25. The flipflop FF15 latches the product MPY2 from the multiplier $24_2$, and transfers the latched product MPY2 to the adder/subtractor unit 25. The flipflop FF16 latches the product MPY3 from the multiplier $24_3$, and transfers the latched product MPY3 to the adder/subtractor unit 25. The flipflop FF17 latches the product MPY4 from the multiplier $24_4$, and transfers the latched product MPY4 to the adder/subtractor unit 25. The flipflop FF18 latches the product MPY5 from the multiplier $24_5$, and transfers the latched product MPY5 to the adder/subtractor unit 25.

The adder/subtractor unit 25 is composed of adder $25_1$ through $25_4$ and a selector $25_5$. The selector $25_5$ selects one of the data received from flipflops F8 and F19 in response to the control signal S4 received from the controller unit 30, and outputs the selected data. The data from the flipflop F8 is selected for the discrete wavelet transform, while the data from the flipflop F19 is selected for the discrete cosine transform.

The adder $25_1$ calculates the sum Σ1 of the products MPY1 and MPY2 received from the flipflops FF14 and FF15, respectively. The adder $25_1$ also calculates the sum Σ2 of the products MPY2 and MPY3 received from the flipflops FF15 and FF16, respectively.

The adder $25_2$ calculates the sum Σ3 of the sum Σ2 received from the adder $25_1$ and the product MPY4 received from the flipflop FF17. The adder $25_2$ also calculates the sum Σ4 of the product MPY4 and the data received from the selector $25_5$. The sums Σ3 and Σ4 are transferred to the adder $25_3$.

The adder $25_3$ calculates the sum Σ5 of the sums Σ1 and Σ3 received from the adder $25_1$ and the adder $25_2$, respectively. The adder $25_3$ also calculates the sum Σ6 of the sums Σ3 and Σ4 received from the adder $25_2$.

The adder $25_4$ calculates the sum Σ7 of the sums Σ5 and Σ6 received from the adder $25_3$. The sum Σ7 is transferred to the flipflop FF19.

The flipflop FF19 latches the sum Σ7 and transfers the latched sum Σ7 to the selector $25_5$ and the limiter 26.

The limiter 26 receives the sum Σ7 from the flipflop FF19, and outputs an output data defined as follows: the output data is equal to the sum Σ7 in the event that the sum Σ7 is smaller than a specified value, while the output data is equal to the specified value in the event that the sum Σ7 is equal to or larger than the specified value.

The flipflop FF20 latches the output data received from the limiter 26, and develops the latched output data on the output.

The aforementioned latches 22, 23, flipflops 19 and 20 allows the image processing apparatus to achieve pipeline processing. One skilled in the art would appreciate that the latches 22, 23, flipflops 19 and 20 may be removed in an alternative embodiment.

Below is an explanation of the operation of the image processing apparatus in this embodiment.

1-1) Procedure of Encoding Pixel Data through the Discrete Wavelet Transform Using the Irreversible 9/7 Filter This procedure begins with providing pixel data for the storage unit 11. It should be noted that "mirror" pixel data of "virtual pixels" may be provided for the storage unit 11 when the pixel of interest is close to the end of the image The virtual pixels are defined as being pixels virtually disposed around the image, which are symmetrical to the pixels near the end of the image. The "mirror" pixel data are defined as the pixel data associated with the "virtual pixels". The pixel data associated with the pixel of interest is set to the flipflop FF4 of the storage unit 11.

After the pixel data f0 through f8 are respectively latched into the flipflop FF0 through FF8, the controller unit 30 develops the control signal S1 to indicate the rearrangement circuit 12 to perform the rearrangement of the pixel data f0 through f8 so that the order of the pixel data f0 through f8 are adapted to encoding through the discrete wavelet transform using the irreversible 9/7 filter. In response to the control signal S1, the rearrangement circuit 12 executes the rearrangement as indicated by the row denoted by "9/7 (ENCODING)". In the event that the pixel of interest is positioned in the even numbered columns, for example, the rearrangement circuit 12 outputs the pixel data f8, which is associated with X(2n+4) in the equation (1), as the pixel data m1, while outputting the pixel data f0, which is associated with X(2n−4) in the equation (1), as the pixel data m2. The same goes for the pixel data m3 through m8. In the event that the pixel of interest is positioned in the odd numbered columns, the rearrangement circuit 12 outputs zero in place of the pixel data f0, as the pixel data m2.

The controller unit 30 then develops the control signal S2 to indicate the adder $21_1$ to $21_4$ to execute addition. The adder $21_1$ calculates the sum a1 of the pixel data m1 and m2. The calculation of the sum a1 is equivalent to the calculation of the term "X(2n−4)+X(2n+4)" in the equation (1). The sum a1 is transferred to the flipflop FF9 of the latch 22. Correspondingly, the adder $21_2$, $21_3$, and $21_4$ calculate the sum a2 of the pixel data m3 and m4, the sum a3 of the pixel data m5 and m6, and the sum a4 of the pixel data m7 and m8, respectively The calculations of sums a2, a2 and a3 are equivalent to the calculations of the term "X(2n+3)+X(2n−3)", "X(2n+2)+X(2n−2)", and "X(2n+1)+X(2n−1)", respectively, in the equation (1). The sums a2, a3, and a4 are transferred to the flipflops FF10, FF11, FF12, respectively.

In the meantime, the flipflop FF13 receives the pixel data f4, associated with the pixel of interest, from the flipflop FF4.

The controller unit 30 then develops the control signal S3 describing the coefficients α to ε so that the coefficients α to ε are adaptive to encoding through the discrete wavelet transform using the irreversible 9/7 filter. In the event that the pixel of interest is positioned in the even numbered columns, the coefficient α is set to W1, and this results in that the multiplier $23_1$ calculates the product MPY1 of the sum a1 and the coefficient W1. The calculation of the product MPY1 is equivalent to the calculation of the term "W1×{X(2n−4)+X(2n+4)}" in the equation (1). In the event that the pixel of interest is positioned in the even numbered columns, on the other hand, the product MPY1 is set to zero, because the coefficient α is defined as being zero. The product MPY1 is transferred from the multiplier $23_1$ to the flipflop FF14 of the latch 24.

Correspondingly, the coefficient β is set to −W0 in the event that the pixel of interest is positioned in the even numbered columns, and this results in that the multiplier $23_2$ calculates the product MPY2 of the sum a2 and the coefficient −W0. The calculation of the product MPY2 is equivalent to the calculation of the term "−W0×{X(2n−3)+X(2n+3)}" in the equation (1). In the event that the pixel of interest is positioned in the even numbered columns, on the other hand, the coefficient β is set to W4, and this results in that the multiplier $23_2$ calculates the product MPY2 of the sum a2 and the coefficient W4. The calculation of the product MPY2 is equivalent to the calculation of the term "W4×{X(2n−3)+X(2n+3)}" in the equation (1). The product MPY2 is transferred from the multiplier $23_2$ to the flipflop FF15 of the latch 24.

Correspondingly, the coefficient γ is set to −W3 in the event that the pixel of interest is positioned in the even numbered columns, and this results in that the multiplier $23_3$ calculates the product MPY3 of the sum a3 and the coefficient −W3. The calculation of the product MPY3 is equivalent to the calculation of the term "−W3×{X(2n−2)+X(2n+2)}" in the equation (1). In the event that the pixel of interest is positioned in the even numbered columns, on the other hand, the coefficient γ is set to −W2, and this results in that the multiplier $23_3$ calculates the product MPY3 of the sum a3 and the coefficient −W2. The calculation of the product MPY3 is equivalent to the calculation of the term "−W2×{X(2n−2)+X(2n+2)}" in the equation (1). The product MPY3 is transferred from the multiplier $23_3$ to the flipflop FF16 of the latch 24.

Correspondingly, the coefficient δ is set to W5 in the event that the pixel of interest is positioned in the even numbered columns, and this results in that the multiplier $23_4$ calculates the product MPY4 of the sum a4 and the coefficient W5. The calculation of the product MPY4 is equivalent to the calculation of the term "W5×{X(2n−1)+X(2n+1)}" in the equation (1). In the event that the pixel of interest is positioned in the even numbered columns, on the other hand, the coefficient δ is set to −W6, and this results in that the multiplier $23_4$ calculates the product MPY4 of the sum a4 and the coefficient −W6. The calculation of the product MPY3 is equivalent to the calculation of the term "−W6×{X(2n−1)+X(2n+1)}" in the equation (1). The product MPY4 is transferred from the multiplier $23_4$ to the flipflop FF17 of the latch 24.

Correspondingly, the coefficient ε is set to W7 in the event that the pixel of interest is positioned in the even numbered columns, and this results in that the multiplier $23_5$ calculates the product MPY5 of the pixel data f4 from the flipflop FF13 and the coefficient W5. The calculation of the product MPY5 is equivalent to the calculation of the term "W7×X(2n)" in the equation (1). In the event that the pixel of interest is positioned in the even numbered columns, on the other hand, the coefficient ε is set to W8, and this results in that the multiplier $23_5$ calculates the product MPY5 of the pixel data f4 and the coefficient W8. The calculation of the product MPY5 is equivalent to the calculation of the term "W8×X(2n+1)" in the equation (1). The product MPY5 is transferred from the multiplier $23_5$ to the flipflop FF18 of the latch 24.

The controller unit 30 develops the control signal S4 to indicate the selector $25_5$ within the adder/subtractor unit 25 to select the output of the flipflop FF18. This allows the adder/subtractor unit 25 to calculate the sum of the products MPY1 to MPY5 received from the respective flipflops FF14 to FF18 by using the adder $25_1$ to adder $25_4$. The sum of the products MPY1 to MPY5 is equal to Y(2n) in the equation (1) in the event that the pixel of interest is positioned in the even numbered columns, while equal to Y(2n+1) in the equation (2) in the event that the pixel of interest is positioned in the odd numbered columns. After the calculation of Y(2n) or Y(2n+1), the adder/subtractor unit 25 transfers Y(2n) or Y(2n+1) to the flipflop FF19.

The flipflop FF19 provides the limiter 26 with Y(2n) or Y(2n+1), and the output of the limiter 26 is latched by the flipflop FF20. The output of the flipflop FF20 is the encoded pixel data for the pixel of interest.

The same goes for the other pixels of the image, and this achieves 2-dimentional discrete wavelet transform of the pixel data.

(1-2) Decoding through the Discrete Wavelet Transform Using the Irreversible 9/7 Filter The procedure of decoding the pixel data through the discrete wavelet transform using the irreversible 9/7 filter is almost identical to that of encoding, except for that the rearrangement of the pixel data f0 to f8 is executed as indicated by the row "9/7 DECODING" in FIG. 3, and that the coefficients α to ε are set to the value as indicated by the second row in FIG. 3. Therefore, no detailed explanation of the decoding is given.

(1-3) Encoding through the Discrete Cosine Transform

FIGS. 5 to 7 are timing diagrams illustrating the procedure of encoding the pixel data through the discrete cosine transform. The procedures at clock periods CLK1 to CLK27, which are defined by a clock signal, are respectively described below in detail.

Clock Periods CLK1 to CLK9

As shown in FIG. 5, the pixel data f0 to f7 are serially transferred to the flipflop FF0 to FF7, respectively, during the clock period CLK1 through CLK9. After the flipflops FF0 to FF7 latches the pixel data f0 to f7, the processing apparatus starts encoding the pixel data of the pixels.

At the clock period CLK9, the controller unit 30 develops the control signal S1 to indicate the rearrangement circuit 12 to execute a procedure defined for the clock period CLK9. In response to the control signal S1, the rearrangement circuit 12 outputs the pixel data f0, and f7 as the pixel data m5, and m6, respectively. The adder $21_3$ calculates the sum of the pixel data m5 and m6, that is, the sum a0 (=f0+f7) in the equation (9). The calculated sum a0 is stored into the flipflop FF11 at the end of the clock period CLK9. It should be noted that FIGS. 5 to 7 refer to invalid data as symbols "*", while referring to zero as symbols "x0".

Clock Period CLK10

At the following clock period CLK10, the rearrangement circuit 12 outputs the pixel data f1 and f6 as the pixel data m5 and m6, respectively, in response to the control signal S1, which is developed to indicate the rearrangement circuit 12 to execute a procedure defined for the clock period CLK10. The adder $21_3$ calculates the sum of the pixel data m5 and m6, that is, the sum a1 (=f1+f6) in the equation (9). The calculated sum a1 is stored into the flipflop FF11 at the end of the clock period CLK10.

In the meantime, the controller unit 30 sets the coefficient γ to D3, and the multiplier $23_3$ receives the sum a0 (=f0+f7) from the flipflop FF11. This allows the multiplier $23_3$ to calculate the product of the sum a0 and the coefficient D3 as described in the equation (10). The calculated product "a0×D3" is stored into the flipflop FF16 at the end of the clock period CLK10.

In addition, the flipflops FF14, FF15, and FF17 are reset to zero at the end of the clock period CLK10.

Clock Period CLK11

During the following clock period CLK11, the rearrangement circuit 12 outputs the pixel data f2 and f5 as the pixel data m5 and m6, respectively, in response to the control signal S1, which is developed to indicate the rearrangement circuit 12 to execute a procedure defined for the clock period CLK11. The adder $21_3$ calculates the sum of the pixel data m5 and m6, that is, the sum a2 (=f2+f5) described in the equation (9). The calculated sum a2 is stored into the flipflop FF11 at the end of the clock period CLK11.

In the mean time, the controller unit 30 sets the coefficient γ to D3, and the multiplier $23_3$ receives the sum a1 (=f1+f6) from the flipflop FF11. This allows the multiplier $23_3$ to calculate the product of the sum a1 and the coefficient D3 as described in the equation (10). The calculated product "a1×D3" is stored into the flipflop FF16 at the end of the clock period CLK11.

In addition, the flipflops FF14, FF15, and FF17 are reset to zero at the end of the clock period CLK11.

Furthermore, the adder/subtractor unit 25 calculates the sum of the outputs of the flipflops FF14 to FF17 and the selector 25$_5$. The fact that the flipflops FF14, FF15, and FF17 are reset to zero results in that the output of the adder/subtractor unit 25 is equal to the output of the flipflop FF16, that is, the product "a0×D3". The product "a0×D3" is latched by the flipflop FF19 at the end of the CLK11.

Clock Period CLK12

During the following clock period CLK12, the rearrangement circuit 12 outputs the pixel data f3 and f4 as the pixel data m5 and m6, respectively, in response to the control signal S1, which is developed to indicate the rearrangement circuit 12 to execute a procedure defined for the clock period CLK12. The adder 21$_3$ calculates the sum of the pixel data m5 and m6, that is, the sum a3 (=f3+f4) described in the equation (9). The calculated sum a3 is stored into the flipflop FF11 at the end of the clock period CLK12.

In the mean time, the controller unit 30 sets the coefficient γ to D3, and the multiplier 23$_3$ receives the sum a2 (=f2+f5) from the flipflop FF11. This allows the multiplier 23$_3$ to calculate the product of the sum a2 and the coefficient D3 as described in the equation (10). The calculated product "a2×D3" is stored into the flipflop FF16 at the end of the clock period CLK11.

In addition, the flipflops FF14, FF15, and FF17 are reset to zero at the end of the clock period CLK12.

Furthermore, the adder/subtractor unit 25 calculates the sum of the outputs of the flipflops FF14 to FF17 and the selector 25$_5$. The fact that the selector 25$_5$ selects the output of the flipflop FF19, and the flipflops FF14, FF15, and FF17 are reset to zero results in that the adder/subtractor unit 25 calculates the sum of the product "a0×D3" received from the flip-flop FF19 and the product "a1×D3" received from the flipflop FF16, that is, the term "(a0+a1)×D3". The calculated term "(a0+a1)×D3" is latched by the flipflop FF19 at the end of the CLK12.

Furthermore, the product "a0×D3", which has been latched by the flipflop FF19, is transferred to the flipflop FF20 at the end of the clock period CLK12 before the latch of the calculated term "(a0+a1)×D3".

Clock Period CLK13

During the following clock period CLK13, as shown in FIG. 6, the rearrangement circuit 12 outputs the pixel data f0 and f7 as the pixel data m5 and m6, respectively, in response to the control signal S1, which is developed to indicate the rearrangement circuit 12 to execute a procedure defined for the clock period CLK13. The adder 21$_3$ calculates the sum of the pixel data m5 and m6, that is, the sum a0 (=f0+f7) described in the equation (9). The calculated sum a3 is stored into the flipflop FF11 at the end of the clock period CLK13.

In the mean time, the controller unit 30 sets the coefficient γ to D3, and the multiplier 23$_3$ receives the sum a3 (=f3+f4) from the flipflop FF11. This allows the multiplier 23$_3$ to calculate the product of the sum a3 and the coefficient D3 as described in the equation (10). The calculated product "a3×D3" is set to the flipflop FF16 at the end of the clock period CLK13.

In addition, the flipflops FF14, FF15, and FF17 are reset to zero at the end of the clock period CLK13.

Furthermore, the adder/subtractor unit 25 calculates the sum of the outputs of the flipflops FF14 to FF17 and the selector 25$_5$. The fact that the selector 25$_5$ selects the output of the flipflop FF19, and the flipflops FF14, FF15, and FF17 are reset to zero results in that the adder/subtractor unit 25 calculates the sum of the product "(a0+a1)×D3" received from the flipflop FF19 and the product "a2×D3" received from the flipflop FF16, that is, the term "(a0+a1+a2)×D3". The calculated term "(a0+a1+a2)×D3" is latched by the flipflop FF19 at the end of the CLK13.

Furthermore, the term "(a0+a1)×D3", which has been latched by the flipflop FF19, is transferred to the flipflop FF20 at the end of the clock period CLK13 before the latch of the calculated term "(a0+a1+a2)×D3".

Clock Period CLK14

During the following clock period CLK14, the rearrangement circuit 12 outputs the pixel data f1 and f6 as the pixel data m5 and m6, respectively, in response to the control signal S1, which is developed to indicate the rearrangement circuit 12 to execute a procedure defined for the clock period CLK14. The adder 21$_3$ calculates the sum of the pixel data m5 and m6, that is, the sum −a1 (=−(f1+f6)) described in the equation (9). The calculated sum −a1 is stored into the flipflop FF11 at the end of the clock period CLK14.

In the mean time, the controller unit 30 sets the coefficient γ to D3, and the multiplier 23$_3$ receives the sum a0 (=f0+f7) from the flipflop FF11. This allows the multiplier 23$_3$ to calculate the product of the sum a0 and the coefficient D3 as described in the equation (10). The calculated product "a0×D3" is stored into the flipflop FF16 at the end of the clock period CLK14.

In addition, the flipflops FF14, FF15, and FF17 are reset to zero at the end of the clock period CLK14.

Furthermore, the adder/subtractor unit 25 calculates the sum of the outputs of the flipflops FF14 to FF17 and the selector 25$_5$. The fact that the selector 25$_5$ selects the output of the flipflop FF19, and the flipflops FF14, FF15, and FF17 are reset to zero results in that the adder/subtractor unit 25 calculates the sum of the product "(a0+a1+a2)×D3" received from the flipflop FF19 and the product "a3×D3" received from the flipflop FF16, that is, the term "(a0+a1+a2+a3)× D3". The calculated term "(a0+a1+a2+a3)×D3" is latched by the flipflop FF19 at the end of the CLK14.

Furthermore, the term "(a0+a1+a2)×D3", which has been latched by the flipflop FF19, is transferred to the flipflop FF20 at the end of the clock period CLK14 before the latch of the calculated term "(a0+a1+a2+a3)×D3".

Clock Period CLK15

During the following clock period CLK15, the rearrangement circuit 12 outputs the pixel data f2 and f5 as the pixel data m5 and m6, respectively, in response to the control signal S1, which is developed to indicate the rearrangement circuit 12 to execute a procedure defined for the clock period CLK15. The adder 21$_3$ calculates the sum of the pixel data m5 and m6, that is, the sum −a2 (=−(f2+f5)) described in the equation (9). The calculated sum −a2 is stored into the flipflop FF11 at the end of the clock period CLK15.

In the mean time, the controller unit 30 sets the coefficient γ to D3, and the multiplier 23$_3$ receives the sum −a1 (=−(f1+f6)) from the flipflop FF11. This allows the multiplier 23$_3$ to calculate the product of the sum −a1 and the coefficient D3 as described in the equation (10). The calculated product "−a1×D3" is stored into the flipflop FF16 at the end of the clock period CLK15.

In addition, the flipflops FF14, FF15, and FF17 are reset to zero at the end of the clock period CLK15.

Furthermore, the adder/subtractor unit 25 calculates the sum of the outputs of the flipflops FF14 to FF17 and the selector 25$_5$. The fact that the selector 25$_5$ is controlled to output zero, and the flipflops FF14, FF15, and FF17 are reset to zero results in that the adder/subtractor unit 25 outputs the product "a0×D3", which has been stored in the flipflop FF16. The calculated product "a0×D3" is latched by the flipflop FF19 at the end of the CLK15.

Furthermore, the term "(a0+a1+a2+a3)×D3", which has been latched by the flipflop FF19, is transferred to the flipflop FF20 at the end of the clock period CLK15 before the latch of the calculated produce "a0×D3". This allows the output of the encoded pixel data F0 (=(a0+a1+a2+a3)×D3) from the flipflop FF20 at the following clock period CLK16.

Clock Period CLK16

During the following clock period CLK16, the rearrangement circuit 12 outputs the pixel data f3 and f4 as the pixel data m5 and m6, respectively, in response to the control signal S1, which is developed to indicate the rearrangement circuit 12 to execute a procedure defined for the clock period CLK16. The adder $21_3$ calculates the sum of the pixel data m5 and m6, that is, the sum a3 (=f3+f4) described in the equation (9). The calculated sum a3 is stored into the flipflop FF11 at the end of the clock period CLK16.

In the mean time, the controller unit 30 sets the coefficient γ to D3, and the multiplier $23_3$ receives the sum −a2 (=−(f2+f5)) from the flipflop FF11. This allows the multiplier $23_3$ to calculate the product of the sum −a2 and the coefficient D3 as described in the equation (10). The calculated product "−a2×D3" is stored into the flipflop FF16 at the end of the clock period CLK16.

In addition, the flipflops FF14, FF15, and FF17 are reset to zero at the end of the clock period CLK16.

Furthermore, the adder/subtractor unit 25 calculates the sum of the outputs of the flipflops FF14 to FF17 and the selector $25_5$. The fact that the selector $25_5$ selects the output of the flipflop FF19, and the flipflops FF14, FF15, and FF17 are reset to zero results in that the adder/subtractor unit 25 calculates the sum of the product "a0×D3" received from the flip-flop F19 and the product "−a1×D3" received from the flipflop FF16, that is, the term "(a0−a1)×D3". The calculated term "(a0−a1)×D3" is latched by the flipflop FF19 at the end of the CLK16.

Furthermore, the term "a0×D3", which has been latched by the flipflop FF19, is transferred to the flipflop FF20 at the end of the clock period CLK16 before the latch of the calculated term "(a0−a1)×D3".

Clock Period CLK17

During the following clock period CLK17, the rearrangement circuit 12 outputs the pixel data f0 and f7 as the pixel data m1 and m2, the pixel data f1 and f6 as the pixel data m3 and m4, respectively, in response to the control signal S1, which is developed to indicate the rearrangement circuit 12 to execute a procedure defined for the clock period CLK17. The adder $21_1$ calculates the sum of the pixel data m1 and m2, that is the sum a0 (=f0+f7) described in the equation (9). The calculated sum a0 is stored in the flipflop FF9 at the end of the clock period CLK17. In the meantime, the adder $21_2$ calculates the sum of the pixel data m3 and m4, that is, the sum a1 (=f1+f6) described in the equation (9). The calculated sum a1 is stored into the flip-flop FF10 at the end of the clock period CLK17.

In the mean time, the controller unit 30 sets the coefficient γ to D3, and the multiplier $23_3$ receives the sum a3 (=f3+f4) from the flipflop FF11. This allows the multiplier $23_3$ to calculate the product of the sum a2 and the coefficient D3 as described in the equation (10). The calculated product "a3×D3" is stored into the flipflop FF16 at the end of the clock period CLK17.

In addition, the flipflops FF14, FF15, and FF17 are reset to zero at the end of the clock period CLK17.

Furthermore, the adder/subtractor unit 25 calculates the sum of the outputs of the flipflops FF14 to FF17 and the selector $25_5$. The fact that the selector $25_5$ selects the output of the flipflop FF19, and the flipflops FF14, FF15, and FF17 are reset to zero, results in that the adder/subtractor unit 25 calculates the sum of the term "(a0−a1)×D3" received from the flipflop F19 and the product "−a2×D3" received from the flipflop FF16, that is, the term "(a0−a1−a2)×D3". The calculated term "(a0−a1−a2)×D3" is latched by the flipflop FF19 at the end of the CLK17.

Furthermore, the term "(a0−a1)×D3", which has been latched by the flipflop FF19, is transferred to the flipflop FF20 at the end of the clock period CLK17 before the latch of the calculated term "(a0−a1−a2)×D3".

Clock Period CLK18

During the following clock period CLK18, the rearrangement circuit 12 outputs the pixel data f3 and f4 as the pixel data m1 and m2, the pixel data f2 and f5 as the pixel data m3 and m4, respectively, in response to the control signal S1, which is developed to indicate the rearrangement circuit 12 to execute a procedure defined for the clock period CLK18. The adder $21_1$ calculates the sum of the pixel data m1 and m2, that is the sum −a3 (=−(f3+f4)) described in the equation (9). The calculated sum −a3 is stored in the flipflop FF9 at the end of the clock period CLK18. In the meantime, the adder $21_2$ calculates the sum of the pixel data m3 and m4, that is, the sum −a2 (=−(f2+f5)) described in the equation (9). The calculated sum −a3 is stored into the flipflop FF10 at the end of the clock period CLK18.

In the mean time, the controller unit 30 sets the coefficient α to D5, and the multiplier $23_1$ receives the sum a0 (=f0+f7) from the flipflop FF9. This allows the multiplier $23_1$ to calculate the product of the sum a0 and the coefficient D5 as described in the equation (10). The calculated product "a0×D5" is stored into the flipflop FF14 at the end of the clock period CLK18.

Correspondingly, the controller unit 30 sets the coefficient β to D1, and the multiplier $23_2$ receives the sum a1 (=f1+f6) from the flipflop FF10. This allows the multiplier $23_2$ to calculate the product of the sum a1 and the coefficient D1 as described in the equation (10). The calculated product "a1×D1" is stored into the flipflop FF15 at the end of the clock period CLK18.

In addition, the flipflops FF16, and FF17 are reset to zero at the end of the clock period CLK18.

Furthermore, the adder/subtractor unit 25 calculates the sum of the outputs of the flipflops FF14 to FF17 and the selector $25_5$. The fact that the selector $25_5$ selects the output of the flipflop FF19, and the flipflops FF14, FF15, and FF17 are reset to zero, results in that the adder/subtractor unit 25 calculates the sum of the term "(a0−a1−a2)×D3" received from the flipflop F19 and the product "a3×D3" received from the flipflop FF16, that is, the term "(a0−a1−a2+a3)×D3". The calculated term "(a0−a1−a2+a3)×D3" is latched by the flip-flop FF19 at the end of the CLK18.

Furthermore, the term "(a0−a1−a2)×D3", which has been latched by the flipflop FF19, is transferred to the flipflop FF20 at the end of the clock period CLK18 before the latch of the calculated term "(a0−a1−a2+a3)×D3".

Clock Period CLK19

During the following clock period CLK19, the rearrangement circuit 12 outputs the pixel data f1 and f6 as the pixel data m1 and m2, the pixel data f0 and f7 as the pixel data m3 and m4, respectively, in response to the control signal S1, which is developed to indicate the rearrangement circuit 12 to execute a procedure defined for the clock period CLK19.

The adder $21_1$ calculates the sum of the pixel data m1 and m2, that is the sum −a1 (=−(f1+f6)) described in the equation (9). The calculated sum −a1 is stored into the flipflop FF9 at the end of the clock period CLK19. In the meantime, the adder $21_2$ calculates the sum of the pixel data m3 and m4, that is, the sum a0 (=f0+f7) described in the equation (9). The calculated sum a0 is stored into the flipflop FF10 at the end of the clock period CLK19.

In the mean time, the controller unit 30 sets the coefficient α to D5, and the multiplier $23_1$ receives the sum −a3 (=−(f3+f4)) from the flipflop FF9. This allows the multiplier $23_1$ to calculate the product of the sum −a3 and the coefficient D5 as described in the equation (10). The calculated product "−a3×D5" is stored into the flipflop FF14 at the end of the clock period CLK19.

Correspondingly, the controller unit 30 sets the coefficient β to D1, and the multiplier $23_2$ receives the sum −a2 (=−(f2+f5) from the flipflop FF10. This allows the multiplier $23_2$ to calculate the product of the sum −a2 and the coefficient D1 as described in the equation (10). The calculated product "−a2×D1" is stored into the flipflop FF15 at the end of the clock period CLK19.

In addition, the flipflops FF16, and FF17 are reset to zero at the end of the clock period CLK19.

Furthermore, the adder/subtractor unit 25 calculates the sum of the outputs of the flipflops FF14 to FF17 and the selector $25_5$. The selector $25_5$ is controlled to develop zero on the output by the controller unit 30. The fact that the selector $25_5$ outputs zero, and the flip-flops FF16, and FF17 are reset to zero, results in that the adder/subtractor unit 25 calculates the sum of the product "a0×D5" received from the flipflop FF14 and the product "a1×D1" received from the flipflop FF15, that is, the term "a0×D4+a1×D1". The calculated term "a0×D4+a1×D1" is latched by the flipflop FF19 at the end of the CLK19.

Furthermore, the term "(a0−a1−a2+a3)×D3", which has been latched by the flip-flop FF19, is transferred to the flipflop FF20 at the end of the clock period CLK19 before the latch of the calculated term "a0×D4+a1×D1". This allows the output of the encoded pixel data F4 (=(a0−a1−a2+a3)×D3) from the flipflop FF20 at the following clock period CLK20.

Clock Period CLK20

During the following clock period CLK20, the rearrangement circuit 12 outputs the pixel data f2 and f5 as the pixel data m1 and m2, and the pixel data f3 and f4 as the pixel data m3 and m4, respectively, in response to the control signal S1, which is developed to indicate the rearrangement circuit 12 to execute a procedure defined for the clock period CLK20. The adder $21_1$ calculates the sum of the pixel data m1 and m2, that is the sum a2 (=f2+f5) described in the equation (9). The calculated sum a2 is stored into the flipflop FF9 at the end of the clock period CLK20. In the meantime, the adder $21_2$ calculates the sum of the pixel data m3 and m4, that is, the sum −a3 (=−(f3+f4) described in the equation (9). The calculated sum −a3 is stored into the flipflop FF10 at the end of the clock period CLK20.

In the mean time, the controller unit 30 sets the coefficient α to D5, and the multiplier $23_1$ receives the sum −a1 (=−(f1+f6)) from the flipflop FF9. This allows the multiplier $23_1$ to calculate the product of the sum −a1 and the coefficient D5 as described in the equation (10). The calculated product "−a1×D5" is stored into the flipflop FF14 at the end of the clock period CLK20.

Correspondingly, the controller unit 30 sets the coefficient β to D1, and the multiplier $23_2$ receives the sum a0 (=f0+f7) from the flipflop FF10. This allows the multiplier $23_2$ to calculate the product of the sum a0 and the coefficient D1 as described in the equation (10). The calculated product "a0×D1" is stored into the flipflop FF15 at the end of the clock period CLK20.

In addition, the flipflops FF16, and FF17 are reset to zero at the end of the clock period CLK20.

Furthermore, the adder/subtractor unit 25 calculates the sum of the outputs of the flipflops FF14 to FF17 and the selector $25_5$. The fact that the selector $25_5$ selects the output of the flipflop FF19, and the flipflops FF16 and FF17 are reset to zero, results in that the adder/subtractor unit 25 calculates the sum of the term "a0×D5+a1×D1" received from the flipflop FF19, the product "−a3×D5" received from the flipflop FF14 and the product "−a2×D1" received from the flipflop FF15, that is, the term "(a0−a3)×D5+(a1−a2)× D1". The calculated term "(a0−a3)×D5+(a1−a2)×D1" is latched by the flipflop FF19 at the end of the CLK20.

Furthermore, the term "a0×D5+a1×D1", which has been latched by the flipflop FF19, is transferred to the flipflop FF20 at the end of the clock period CLK20 before the latch of the calculated term "(a0−a3)×D5+(a1−a2)×D1".

Clock Period CLK21

During the following clock period CLK21, as shown in FIG. 7, the rearrangement circuit 12 outputs the pixel data f0 and f7 as the pixel data m1 and m2, the pixel data f1 and f6 as the pixel data m3 and m4, the pixel data f2 and f5 as the pixel data m5 and m6, and the pixel data f3 and f4 as the pixel data m7 and m8 respectively, in response to the control signal S1, which is developed to indicate the rearrangement circuit 12 to execute a procedure defined for the clock period CLK21.

The adder $21_1$ calculates the sum of the pixel data m1 and m2, that is the sum a4 (=f0−f7) described in the equation (9). The calculated sum a4 is stored into the flipflop FF9 at the end of the clock period CLK21. In the meantime, the adder $21_2$ calculates the sum of the pixel data m3 and m4, that is, the sum a5 (=f1−f6) described in the equation (9). The calculated sum a5 is stored into the flipflop FF10 at the end of the clock period CLK21. Furthermore, the adder $21_3$ calculates the sum of the pixel data m5 and m6, that is, the sum a6 (=f2−f5) described in the equation (9). The calculated sum a6 is stored into the flipflop FF11 at the end of the clock period CLK21. In addition, the adder $21_4$ calculates the sum of the pixel data m7 and m8, that is, the sum a7 (=f3−f4) described in the equation (9). The calculated sum a7 is stored into the flipflop FF12 at the end of the clock period CLK21.

In the mean time, the controller unit 30 sets the coefficient α to D5, and the multiplier $23_1$ receives the sum a2 (=f2+f5) from the flipflop FF9. This allows the multiplier $23_1$ to calculate the product of the sum a2 and the coefficient D5 as described in the equation (10). The calculated product "a2×D5" is stored into the flipflop FF14 at the end of the clock period CLK21.

Correspondingly, the controller unit 30 sets the coefficient β to D1, and the multiplier $23_2$ receives the sum −a3 (=f0+f7) from the flipflop FF10. This allows the multiplier $23_2$ to calculate the product of the sum −a3 and the coefficient D1 as described in the equation (10). The calculated product "−a3×D1" is stored into the flipflop FF15 at the end of the clock period CLK21.

In addition, the flipflops FF16, and FF17 are reset to zero at the end of the clock period CLK21.

Furthermore, the adder/subtractor unit 25 calculates the sum of the outputs of the flipflops FF14 to FF17 and the selector $25_5$. The selector $25_5$ is controlled to develop zero on the output by the controller unit 30. The fact that the selector $25_5$ outputs zero and the flip-flops FF16 and FF17 are reset to zero, results in that the adder/subtractor unit 25 calculates the sum of the product "−a1×D5" received from the flipflop FF14 and the product "a0×D1" received from the flipflop FF15, that is, the term "−a1×D5+a0×D1". The calculated term "−a1×D5+a0×D1" is latched by the flipflop FF19 at the end of the CLK21.

Furthermore, the term "(a0−a3)×D5+(a1−a2)×D1", which has been stored by the flipflop FF19, is transferred to the flip-flop FF20 at the end of the clock period CLK21 before the latch of the calculated term "−a1×D5+a0×D1". This allows the output of the encoded pixel data F2 (=(a0−a3)×D5+(a1−a2)×D1) from the flipflop FF20 at the following clock period CLK22.

Clock Period CLK22

During the following clock period CLK22, the rearrangement circuit 12 outputs the pixel data f2 and f5 as the pixel data m1 and m2, the pixel data f0 and f7 as the pixel data m3 and m4, the pixel data f3 and f4 as the pixel data m5 and m6, and the pixel data f1 and f6 as the pixel data m7 and m8 respectively, in response to the control signal S1, which is developed to indicate the rearrangement circuit 12 to execute a procedure defined for the clock period CLK22.

The adder $21_1$ calculates the sum of the pixel data m1 and m2, that is the sum −a6 (=−(f2−f5)) described in the equation (9). The calculated sum −a6 is stored into the flip-flop FF9 at the end of the clock period CLK22. In the meantime, the adder $21_2$ calculates the sum of the pixel data m3 and m4, that is, the sum a4 (=f0−f7) described in the equation (9). The calculated sum a4 is stored into the flipflop FF10 at the end of the clock period CLK22. Furthermore, the adder $21_3$ calculates the sum of the pixel data m5 and m6, that is, the sum −a7 (=−(f3−f4)) described in the equation (9). The calculated sum −a7 is stored into the flipflop FF11 at the end of the clock period CLK22. In addition, the adder $21_4$ calculates the sum of the pixel data m7 and m8, that is, the sum −a5 (=−(f1−f6) described in the equation (9). The calculated sum −a5 is stored into the flipflop FF12 at the end of the clock period CLK22.

In the mean time, the controller unit 30 sets the coefficient $\alpha$ to D6, and the multiplier $23_1$ receives the sum a4 (=f0−f7) from the flipflop FF9. This allows the multiplier $23_1$ to calculate the product of the sum a4 and the coefficient D6 as described in the equation (10). The calculated product "a4×D6" is stored into the flipflop FF14 at the end of the clock period CLK22.

Correspondingly, the controller unit 30 sets the coefficient $\beta$ to D4, and the multiplier $23_2$ receives the sum a4 (=f0−f7) from the flipflop FF10. This allows the multiplier $23_2$ to calculate the product of the sum a4 and the coefficient D4 as described in the equation (10). The calculated product "a4×D4" is stored into the flipflop FF15 at the end of the clock period CLK22.

Correspondingly, the controller unit 30 sets the coefficient $\gamma$ to D2, and the multiplier $23_3$ receives the sum a6 (=f2−f5) from the flipflop FF11. This allows the multiplier $23_3$ to calculate the product of the sum a6 and the coefficient D2 as described in the equation (10). The calculated product "a6×D2" is stored into the flipflop FF16 at the end of the clock period CLK22.

Correspondingly, the controller unit 30 set the coefficient $\delta$ to D0, and the multiplier $23_4$ receives the sum a7 (=f3−f4) from the flip-flop FF12. This allows the multiplier $23_4$ to calculate the product of the sum a7 and the coefficient D0 as described in the equation (10). The calculated product "a7×D0" is stored into the flip-flop FF17 at the end of the clock period CLK22.

Furthermore, the adder/subtractor unit 25 calculates the sum of the outputs of the flipflops FF14 to FF17 and the selector $25_5$. The selector $25_5$ is controlled to select the output of the flipflop FF19 by the controller unit 30. The fact that the selector $25_5$ selects the output of the flipflop FF19, and the flipflops FF16 and FF17 are reset to zero, results in that the adder/subtractor unit 25 calculates the sum of the term "−a1×D5+a0×D1" received from the flipflop FF19, the product "a2×D5" received from the flipflop FF14, and the product "−a3×D1" received from the flipflop FF15, that is, the term "(−a1+a2)×D5+(a0−a3)×D1". The calculated term "(−a1+a2)×D5+(a0−a3)×D1" is latched by the flipflop FF19 at the end of the CLK22.

Furthermore, the term "−a1×D5+a0×D1", which has been stored by the flipflop FF19, is transferred to the flipflop FF20 at the end of the clock period CLK22 before the latch of the calculated term "(−a1+a2)×D5+(a0−a3)×D1".

Clock Period CLK23

During the following clock period CLK23, the rearrangement circuit 12 outputs the pixel data f1 and f6 as the pixel data m1 and m2, the pixel data f3 and f4 as the pixel data m3 and m4, the pixel data f0 and f7 as the pixel data m5 and m6, and the pixel data f2 and f5 as the pixel data m7 and m8 respectively, in response to the control signal S1, which is developed to indicate the rearrangement circuit 12 to execute a procedure defined for the clock period CLK23.

The adder $21_1$ calculates the sum of the pixel data m1 and m2, that is the sum −a5 (=−(f1−f6)) described in the equation (9). The calculated sum −a5 is stored into the flip-flop FF9 at the end of the clock period CLK23. In the meantime, the adder $21_2$ calculates the sum of the pixel data m3 and m4, that is, the sum a7 (=f3−f4) described in the equation (9). The calculated sum a7 is stored into the flipflop FF10 at the end of the clock period CLK23. Furthermore, the adder $21_3$ calculates the sum of the pixel data m5 and m6, that is, the sum a4 (=f0−f7) described in the equation (9). The calculated sum a4 is stored into the flipflop FF11 at the end of the clock period CLK23. In addition, the adder $21_4$ calculates the sum of the pixel data m7 and m8, that is, the sum a6 (=f2−f5) described in the equation (9). The calculated sum a6 is stored into the flipflop FF12 at the end of the clock period CLK23.

In the mean time, the controller unit 30 sets the coefficient $\alpha$ to D6, and the multiplier $23_1$ receives the sum −a6 (=−(f2−f5)) from the flipflop FF9. This allows the multiplier $23_1$ to calculate the product of the sum −a6 and the coefficient D6 as described in the equation (10). The calculated product "−a6×D6" is stored into the flipflop FF14 at the end of the clock period CLK23.

Correspondingly, the controller unit 30 sets the coefficient $\beta$ to D4, and the multiplier $23_2$ receives the sum a0 (=f0−f7) from the flipflop FF10. This allows the multiplier $23_2$ to calculate the product of the sum a0 and the coefficient D4 as described in the equation (10). The calculated product "a0×D4" is stored into the flipflop FF15 at the end of the clock period CLK23.

Correspondingly, the controller unit 30 sets the coefficient $\gamma$ to D2, and the multiplier $23_3$ receives the sum −a7 (=−(f3−f4)) from the flipflop FF11. This allows the multiplier $23_3$ to calculate the product of the sum −a7 and the coefficient D2 as described in the equation (10). The calculated product "−a7×D2" is stored into the flipflop FF16 at the end of the clock period CLK23.

Correspondingly, the controller unit 30 set the coefficient δ to D0, and the multiplier 23₄ receives the sum −a5 (=−(f1−f6)) from the flipflop FF12. This allows the multiplier 23₄ to calculate the product of the sum −a5 and the coefficient D0 as described in the equation (10). The calculated product "−a5×D0" is stored into the flipflop FF17 at the end of the clock period CLK23.

Furthermore, the adder/subtractor unit 25 calculates the sum of the outputs of the flipflops FF14 to FF17 and the selector 25₅. The selector 25₅ is controlled to develop zero on the output by the controller unit 30. This results in that the adder/subtractor unit 25 calculates the sum of the product "a4×D6" received from the flipflop FF14, the product "a5×D4" received from the flipflop FF15, the product "a6×D2" received from the flipflop FF16, and the product "a7×D0" received from the flipflop FF17, that is, the term "a4×D6+a5×D4+a6×D2+a7×D0". The calculated term "a4×D6+a5×D4+a6×D2+a7×D0" is latched by the flipflop FF19 at the end of the CLK23.

Furthermore, the term "(−a1+a2)×D5+(a0−a3)×D1", which has been stored by the flipflop FF19, is transferred to the flipflop FF20 at the end of the clock period CLK23 before the latch of the calculated term "a4×D6+a5×D4+a6×D2+a7×D0". This allows the output of the encoded pixel data F6 (=(−a1+a2)×D5+(a0−a3)×D1) from the flipflop FF20 at the following clock period CLK24.

Clock Period CLK24

During the following clock period CLK24, the rearrangement circuit 12 outputs the pixel data f3 and f4 as the pixel data m1 and m2, the pixel data f2 and f5 as the pixel data m3 and m4, the pixel data f1 and f6 as the pixel data m5 and m6, and the pixel data f0 and f7 as the pixel data m7 and m8 respectively, in response to the control signal S1, which is developed to indicate the rearrangement circuit 12 to execute a procedure defined for the clock period CLK24.

The adder 21₁ calculates the sum of the pixel data m1 and m2, that is the sum −a7 (=−(f3−f4)) described in the equation (9). The calculated sum −a7 is stored into the flip-flop FF9 at the end of the clock period CLK24. In the meantime, the adder 21₂ calculates the sum of the pixel data m3 and m4, that is, the sum a6 (=f2−f5) described in the equation (9). The calculated sum a6 is stored into the flipflop FF10 at the end of the clock period CLK24. Furthermore, the adder 21₃ calculates the sum of the pixel data m5 and m6, that is, the sum −a5 (=f1−f6) described in the equation (9). The calculated sum −a5 is stored into the flipflop FF11 at the end of the clock period CLK24. In addition, the adder 21₄ calculates the sum of the pixel data m7 and m8, that is, the sum a4 (=f0−f7) described in the equation (9). The calculated sum a4 is stored into the flipflop FF12 at the end of the clock period CLK24.

In the mean time, the controller unit 30 sets the coefficient α to D6, and the multiplier 23₁ receives the sum −a5 (=−(f1−f6)) from the flipflop FF9. This allows the multiplier 23₁ to calculate the product of the sum −a5 and the coefficient D6 as described in the equation (10). The calculated product "−a5×D6" is stored into the flipflop FF14 at the end of the clock period CLK24.

Correspondingly, the controller unit 30 sets the coefficient β to D4, and the multiplier 23₂ receives the sum a7 (=f3−f4) from the flipflop FF10. This allows the multiplier 23₂ to calculate the product of the sum a7 and the coefficient D4 as described in the equation (10). The calculated product "a7×D4" is stored into the flipflop FF15 at the end of the clock period CLK24.

Correspondingly, the controller unit 30 sets the coefficient γ to D2, and the multiplier 23₃ receives the sum a4 (=f0−f7) from the flipflop FF11. This allows the multiplier 23₃ to calculate the product of the sum a4 and the coefficient D2 as described in the equation (10). The calculated product "a4×D2" is stored into the flipflop FF16 at the end of the clock period CLK24.

Correspondingly, the controller unit 30 set the coefficient δ to D0, and the multiplier 23₄ receives the sum a6 (=f2−f5) from the flip-flop FF12. This allows the multiplier 23₄ to calculate the product of the sum a6 and the coefficient D0 as described in the equation (10). The calculated product "a6×D0" is stored into the flip-flop FF17 at the end of the clock period CLK24.

Furthermore, the adder/subtractor unit 25 calculates the sum of the outputs of the flipflops FF14 to FF17 and the selector 25₅. The selector 25₅ is controlled to develop zero on the output by the controller unit 30. This results in that the adder/subtractor unit 25 calculates the sum of the product "−a6×D6" received from the flipflop FF14, the product "−a4×D4" received from the flipflop FF15, the product "−a7×D2" received from the flipflop FF16, and the product "−a5×D0" received from the flipflop FF17, that is, the term "−a6×D6+a4×D4−a7×D2−a5×D0". The calculated term "−a6×D6+a4×D4−a7×D2−a5×D0" is latched by the flipflop FF19 at the end of the CLK24.

Furthermore, the term "a4×D6+a5×D4+a6×D2+a7×D0", which has been stored by the flipflop FF19, is transferred to the flip-flop FF20 at the end of the clock period CLK24 before the latch of the term "−a6×D6+a4×D4−a7×D2−a5×D0". This allows the output of the encoded pixel data F1 (=a4×D6+a5×D4+a6×D2+a7×D0) from the flipflop FF20 at the following clock period CLK25.

Clock Period CLK25

At the following clock period CLK25, pixel data of a next pixel of interest are provided for the flipflops FF0 to FF7. The procedure for encoding the pixel data of the next pixel of interest is identical to that of the pixel data of the current pixel of interest. Therefore, detailed explanation is not given, hereinafter, for encoding the pixel data of the next pixel of interest.

During the clock period CLK25, the rearrangement circuit 12 outputs the pixel data m1 to m8 for the next pixel of interest in response to the control signal S1 received from the controller unit 30.

In the mean time, the controller unit 30 sets the coefficient α to D6, and the multiplier 23₁ receives the sum −a7 (=−(f3−f4)) from the flipflop FF9. This allows the multiplier 23₁ to calculate the product of the sum −a7 and the coefficient D6 as described in the equation (10). The calculated product "−a7×D6" is stored into the flipflop FF14 at the end of the clock period CLK25.

Correspondingly, the controller unit 30 sets the coefficient β to D4, and the multiplier 23₂ receives the sum a6 (=f2−f5) from the flipflop FF10. This allows the multiplier 23₂ to calculate the product of the sum a6 and the coefficient D4 as described in the equation (10). The calculated product "a6×D4" is stored into the flipflop FF15 at the end of the clock period CLK25.

Correspondingly, the controller unit 30 sets the coefficient γ to D2, and the multiplier 23₃ receives the sum −a5 (=f1−f6) from the flipflop FF11. This allows the multiplier 23₃ to calculate the product of the sum −a5 and the coefficient D2 as described in the equation (10). The calculated product "−a5×D2" is stored into the flipflop FF16 at the end of the clock period CLK25.

Correspondingly, the controller unit 30 set the coefficient δ to D0, and the multiplier 23$_4$ receives the sum a4 (=f0-f7) from the flip-flop FF12. This allows the multiplier 23$_4$ to calculate the product of the sum a4 and the coefficient D0 as described in the equation (10). The calculated product "a4×D0" is stored into the flip-flop FF17 at the end of the clock period CLK25.

Furthermore, the adder/subtractor unit 25 calculates the sum of the outputs of the flipflops FF14 to FF17 and the selector 25$_5$. The selector 25$_5$ is controlled to develop zero on the output by the controller unit 30. This results in that the adder/subtractor unit 25 calculates the sum of the product "−a5×D6" received from the flipflop FF14, the product "−a7×D4" received from the flipflop FF15, the product "a4×D2" received from the flipflop FF16, and the product "a6×D0" received from the flipflop FF17, that is, the term "−a5×D6−a7×D4+a4×D2+a6×D0". The calculated term "−a5×D6−a7×D4+a4×D2+a6×D0" is latched by the flipflop FF19 at the end of the CLK25.

Furthermore, the term "−a6×D6+a4×D4−a7×D2−a5×D0", which has been stored by the flipflop FF19, is transferred to the flip-flop FF20 at the end of the clock period CLK25 before the latch of the term "−a5×D6−a7×D4+a4×D2+a6×D0". This allows the output of the encoded pixel data F3 (=−a6×D6+a4×D4−a7×D2−a5×D0) from the flip-flop FF20 at the following clock period CLK26.

Clock Period CLK26

During the clock period CLK25, the rearrangement circuit 12 outputs the pixel data m1 to m8 for the next pixel of interest in response to the control signal S1 received from the controller unit 30. In the mean time, the multipliers 23$_1$ to 23$_4$ execute the operation for encoding the pixel data of the next pixel of interest.

Furthermore, the adder/subtractor unit 25 calculates the sum of the outputs of the flipflops FF14 to FF17 and the selector 25$_5$. The selector 25$_5$ is controlled to develop zero on the output by the controller unit 30. This results in that the adder/subtractor unit 25 calculates the sum of the product "−a7×D6" received from the flipflop FF14, the product "−a6×D4" received from the flipflop FF15, the product "−a5×D2" received from the flipflop FF16, and the product "a4×D0" received from the flipflop FF17, that is, the term "−a7×D6−a6×D4−a5×D2+a4×D0". The calculated term "−a7×D6−a6×D4−a5×D2+a4×D0" is latched by the flipflop FF19 at the end of the CLK26.

Furthermore, the term "−a5×D6+a7×D4+a4×D2+a6×D0", which has been stored by the flipflop FF19, is transferred to the flip-flop FF20 at the end of the clock period CLK26 before the latch of the term "−a7×D6−a6×D4−a5×D2+a4×D0". This allows the output of the encoded pixel data F5 (=−a5×D6+a7×D4+a4×D2+a6×D0) from the flip-flop FF20 at the following clock period CLK27.

Clock Period CLK27

At the following clock period CLK27, the rearrangement circuit 12 outputs the pixel data m1 to m8 for the next pixel of interest in response to the control signal S1 received from the controller unit 30. In the mean time, the multipliers 23$_1$ to 23$_4$ execute the operation for encoding the pixel data of the next pixel of interest. Furthermore, the adder/subtractor unit 25 executes the operation for encoding the pixel data of the next pixel of interest.

During the clock period CLK27, the term "−a7×D6+a6×D4−a5×D2+a4×D0", which has been stored by the flipflop FF19, is transferred to the flipflop FF20 at the end of the clock period CLK27. This allows the output of the encoded pixel data F7 (=−a7×D6+a6×D4−a5×D2+a4×D0) from the flipflop FF20 at the following clock period CLK28.

(1-4) Decoding through the Discrete Cosine Transform

FIGS. 8 to 10 are timing diagram illustrating the procedure of decoding the pixel data through the discrete cosine transform.

Referring to the equations (13) and (14), the decoded pixel data f0 is obtained from the following equation:

$$f0=\{(f0+f4)/2\}+\{(f0-f4)/2\}. \tag{15}$$

The right hand first term of the equation (15) is obtained from the first row of the matrix of the equation (13), while the right hand second term of the equation (15) is obtained from the first row of the matrix of the equation (14).

Correspondingly, the decoded pixel data f1 to f7 are obtained from the following equations:

$$f1=\{(f1+f5)/2\}+\{(f1-f5)/2\} \tag{17}$$

$$f2=\{(f2+f6)/2\}+\{(f2-f6)/2\}, \tag{18}$$

$$f3=\{(f3+f7)/2\}+\{(f3-f7)/2\}, \tag{19}$$

$$f4=\{(f0+f4)/2\}-\{(f0-f4)/2\}, \tag{20}$$

$$f5=\{(f1+f5)/2\}-\{(f1-f5)/2\}, \tag{21}$$

$$f6=\{(f2+f6)/2\}-\{(f2-f6)/2\}, \text{ and} \tag{22}$$

$$f7=\{(f3+f7)/2\}+\{(f3-f7)/2\}. \tag{23}$$

Because the procedure of obtaining the decoded pixel data f0 to f7 are almost same, the explanation directed to only the decoded pixel data f0 and f4 will be given.

Clock Periods CLK1 to CLK9

The procedure begins with the input of the encoded pixel data F0 to F7. As shown in FIG. 8, the encoded pixel data F0 to F7 are serially transferred to the flipflops FF0 to FF7, respectively.

At the clock period CLK9, the controller unit 30 develops the control signal S1 to indicate the rearrange circuit 12 to execute the procedure defined for the clock period CLK9. In response to the control signal S1, the rearrange circuit 12 outputs the pixel data F2, F6, F0, and F4, as the pixel data m1, m3, m5 and m6, respectively. The pixel data m2, m4, m7, and m8 are set to zero.

The adder 21$_1$ transfers the pixel data m1 to the flipflop FF9, because the pixel data m2 is set to zero. This results in that the pixel data F2 is stored in the flipflop FF9 at the end of the clock period CLK9. The pixel data F2 is used as the element "a2" in the equation (13).

Correspondingly, the adder 21$_2$ transfers the pixel data m3 to the flipflop FF10. This results in that the pixel data F6 is stored in the flipflop FF10 at the end of the clock period CLK9. The pixel data F6 is used as the element "a1" in the equation (13).

Furthermore, the adder 21$_3$ calculates the sum of the pixel data m5 and m6, that is, the sum of the pixel data F0 and F4. This results in that the sum "F0+F4" is stored in the flipflop FF11 at the end of the clock period CLK9. The sum "F0+F4" is used as the element "a0+a3" in the equation (13).

Clock Period CLK10

At the following clock period CLK10, the controller unit 30 develops the control signal S1 to indicate the rearrange circuit 12 to execute the procedure defined for the clock period CLK10. In response to the control signal S1, the rearrange circuit 12 outputs the pixel data F1, F3, F5, and F7 as the pixel data m1, m3, m5 and m7, respectively.

The adder $21_1$ transfers the pixel data ml to the flipflop FF9. This results in that the pixel data F1 is stored in the flipflop FF9 at the end of the clock period CLK10. The pixel data F1 is used as the element "a5" in the equation (14).

Correspondingly, the adder $21_2$ transfers the pixel data m3 to the flipflop FF10. This results in that the pixel data F3 is stored in the flipflop FF10 at the end of the clock period CLK10. The pixel data F3 is used as the element "a7" in the equation (14).

On the other hand, the adder $21_3$ inverts the sign of the pixel data m5. The sign-inverted pixel data −m5 is transferred to the flip-flop FF11. This results in that the sign-inverted pixel data −F5 is stored in the flipflop FF11 at the end of the clock period CLK10. The sign-inverted pixel data −F5 is used as the element "−a6" in the equation (14).

Correspondingly, the adder $21_4$ inverts the sign of the pixel data m7. The sign-inverted pixel data −m7 is transferred to the flip-flop FF11. This results in that the sign-inverted pixel data −F5 is stored in the flipflop FF12 at the end of the clock period CLK10. The sign-inverted pixel data −F5 is used as the element "−a4" in the equation (14).

In the meantime, the multiplier $23_1$ receives the pixel data F2 (=a2) from the flip-flop FF9, while the controller unit 30 sets the coefficient α to D5. This allows the multiplier $23_1$ to calculate the product of a2 and D5 used in the equation (13). The product "a2×D5" is stored into the flipflop FF14 at the end of the clock period CLK10.

Correspondingly, the multiplier $23_2$ receives the pixel data F6 (=a1) from the flip-flop FF10, while the controller unit 30 sets the coefficient β to D1. This allows the multiplier $23_2$ to calculate the product of a1 and D1 used in the equation (13). The product "a1×D1" is stored into the flipflop FF15 at the end of the clock period CLK10.

Correspondingly, the multiplier $23_3$ receives the sum "F0+F4" (=a0+a3) from the flipflop FF11, while the controller unit 30 sets the coefficient γ to D3. This allows the multiplier $23_3$ to calculate the product of the sum "a0+a3" and the coefficient D1 used in the equation (13). The product "(a0+a3)×D1" is stored into the flipflop FF16 at the end of the clock period CLK10.

In addition, the flipflop FF17 is reset to zero at the end of the clock period CLK10.

Clock Period CLK11

At the following clock period CLK11, the controller unit 30 develops the control signal S1 to indicate the rearrange circuit 12 to execute the procedure defined for the clock period CLK11. In response to the control signal S1, the rearrange circuit 12 outputs the pixel data F2, F6, F0, and F4 as the pixel data m1, m3, m5 and m6. respectively.

The adder $21_1$ transfers the pixel data m1 to the flipflop FF9. This results in that the pixel data F2 is stored in the flipflop FF9 at the end of the clock period CLK11. The pixel data F2 is used as the element "a2" in the equation (13).

Correspondingly, the adder $21_2$ transfers the pixel data m3 to the flipflop FF10. This results in that the pixel data F6 is stored in the flipflop FF10 at the end of the clock period CLK11. The pixel data F6 is used as the element "a1" in the equation (14).

On the other hand, the adder $21_3$ calculates the sum of the pixel data m5 and m6, that is, the sum of the pixel data F0 and F4. This results in that the sum "F0+F4" is stored in the flip-flop FF11 at the end of the clock period CLK11. The sum "F0+F4" is used as the element "a0+a3" in the equation (13).

In the meantime, the multiplier $23_1$ receives the pixel data F1 (=a5) from the flip-flop FF9, while the controller unit 30 sets the coefficient α to D6. This allows the multiplier $23_1$ to calculate the product of a5 and D6 used in the equation (14). The product "a5×D6" is stored into the flipflop FF14 at the end of the clock period CLK11.

Correspondingly, the multiplier $23_2$ receives the pixel data F3 (=a7) from the flip-flop FF10, while the controller unit 30 sets the coefficient β to D4. This allows the multiplier $23_2$ to calculate the product of a7 and D4 used in the equation (14). The product "a7×D4" is stored into the flipflop FF15 at the end of the clock period CLK11.

Correspondingly, the multiplier $23_3$ receives the sign-inverted pixel data −F5 (=−a6) from the flipflop FF11, while the controller unit 30 sets the coefficient γ to D2. This allows the multiplier $23_3$ to calculate the product of −a6 and D2 used in the equation (14). The product "−a0×D2" is stored into the flipflop FF16 at the end of the clock period CLK11.

Correspondingly, the multiplier $23_4$ receives the sign-inverted pixel data −F7 (=−a4) from the flipflop FF12, while the controller unit 30 sets the coefficient δ to D0. This allows the multiplier $23_4$ to calculate the product of −a4 and D0 used in the equation (14). The product "−a4×D0" is stored into the flipflop FF17 at the end of the clock period CLK11.

Furthermore, the adder/subtractor unit 25 calculates the sum of the outputs of the flipflops FF14 to FF17 and the selector $25_5$, and transfers the calculated sum to the flipflop FF19. The selector $25_5$ is controlled to develop zero on the output by the controller unit 30. The fact that the selector $25_5$ and the flipflop FF17 output zero results in that the adder/subtractor unit 25 calculates the term "(a0+a3)×D3+a2×D5+a1×D1", that is, the term "(f0+f4)/2". The calculated term "(f0+f4)/2" is latched by the flipflop FF19 at the end of the CLK11.

Clock Period CLK12

At the following clock period CLK12, the controller unit 30 develops the control signal S1 to indicate the rearrange circuit 12 to execute the procedure defined for the clock period CLK12. In response to the control signal S1, the rearrange circuit 12 outputs the pixel data F1, F3, F5, and F7 as the pixel data m1, m3, m5 and m7. respectively.

The adder $21_1$ transfers the pixel data m1 to the flipflop FF9. This results in that the pixel data F1 is stored in the flipflop FF9 at the end of the clock period CLK12. The pixel data F1 is used as the element "a5" in the equation (14).

Correspondingly, the adder $21_2$ transfers the pixel data m3 to the flipflop FF10. This results in that the pixel data F3 is stored in the flipflop FF10 at the end of the clock period CLK12. The pixel data F3 is used as the element "a7" in the equation (14).

On the other hand, the adder $21_3$ inverts the sign of the pixel data m5. The sign-inverted pixel data −m5 is transferred to the flip-flop FF11. This results in that the sign-inverted pixel data −F5 is stored in the flipflop FF11 at the end of the clock period CLK12. The sign-inverted pixel data −F5 is used as the element "−a6" in the equation (14).

Correspondingly, the adder $21_4$ inverts the sign of the pixel data m7. The sign-inverted pixel data −m7 is transferred to the flip-flop FF11. This results in that the sign-inverted pixel data −F5 is stored in the flipflop FF12 at the end of the clock period CLK12. The sign-inverted pixel data −F5 is used as the element "−a4" in the equation (14).

In the meantime, the multiplier $23_1$ receives the pixel data F2 (=a2) from the flip-flop FF9, while the controller unit 30 sets the coefficient α to D5. This allows the multiplier $23_1$ to calculate the product of a2 and D5 used in the equation (13). The product "a2×D5" is stored into the flipflop FF14 at the end of the clock period CLK12.

Correspondingly, the multiplier $23_2$ receives the pixel data F6 (=a1) from the flip-flop FF10, while the controller unit 30 sets the coefficient β to D1. This allows the multiplier $23_2$ to calculate the product of a1 and D1 used in the equation (13). The product "a1×D1" is stored into the flipflop FF15 at the end of the clock period CLK12.

Correspondingly, the multiplier $23_3$ receives the sum "F0+F4" (=a0+a3) from the flipflop FF11, while the controller unit 30 sets the coefficient γ to D3. This allows the multiplier $23_3$ to calculate the product of the sum "a0+a3" and the coefficient D1 used in the equation (13). The product "(a0+a3)×D1" is stored into the flipflop FF16 at the end of the clock period CLK12.

Furthermore, the adder/subtractor unit 25 calculates the sum of the outputs of the flipflops FF14 to FF17 and the selector $25_5$. The selector $25_5$ is controlled to select the output of the flipflop FF19 by the controller unit 30. This results in that the adder/subtractor unit 25 calculates the decoded pixel data f0, because the adder/subtractor unit 25 calculates the sum of the value "a5×D6+a7×D4−a6×D2−a4×D0", which is the sum of the outputs of the flip-flops FF14 to FF17, and the value "(a0+a3)×D3+a2×D5+a1×D1", which is the output of the flipflop FF19. This calculation is equivalent to the calculation of the sum of the term "(f0+f4)/2" and the term "(f0−f4)/2". The decoded pixel data f0 is latched by the flipflop FF19 at the end of the clock period CLK12.

Furthermore, the value "(a0+a3)×D3+a2×D5+a1×D1", which has been stored in the flipflop FF19, is transferred to the flip-flop FF20 at the end of the clock period CLK12. It should be noted that the value "(a0+a3)×D3+a2×D5+a1×D1", latched by the flipflop FF20, is not outputted as the decoded pixel data.

Clock Period CLK13

At the following clock period CLK13, as shown in FIG. 9, the controller unit 30 develops the control signal S1 to indicate the rearrange circuit 12 to execute the procedure defined for the clock period CLK13. In response to the control signal S1, the rearrange circuit 12 outputs the pixel data F6, F2, F0, and F4 as the pixel data m1, m3, m5 and m6, respectively. These pixel data m1, m3, m5 and m6 are used for the calculation of the decoded pixel data f1 and f7, that is, the calculation of the second rows of the matrices in the equations (13) and (14). The output of the pixel data m1, m3, m5 and m6 allows the adders $23_1$ to $23_3$ to execute addition for calculating the decoded pixel data f1 and f7.

In the meantime, the multiplier $23_1$ receives the pixel data F2 (=a2) from the flip-flop FF9, while the controller unit 30 sets the coefficient α to D5. This allows the multiplier $23_1$ to calculate the product of a2 and D5 used in the equation (13). The product "a2×D5" is stored into the flipflop FF14 at the end of the clock period CLK13.

Correspondingly, the multiplier $23_2$ receives the pixel data F6 (=a1) from the flip-flop FF10, while the controller unit 30 sets the coefficient β to D1. This allows the multiplier $23_2$ to calculate the product of a1 and D1 used in the equation (13). The product "a1×D1" is stored into the flipflop FF15 at the end of the clock period CLK13.

Correspondingly, the multiplier $23_3$ receives the sum "F0+F4" (=a0+a3) from the flipflop FF11, while the controller unit 30 sets the coefficient γ to D3. This allows the multiplier $23_3$ to calculate the product of the sum "a0+a3" and the coefficient D1 used in the equation (13). The product "(a0+a3)×D1" is stored into the flipflop FF16 at the end of the clock period CLK13.

The output of the multiplier $23_4$ is ignored.

Furthermore, the adder/subtractor unit 25 calculates the sum of the outputs of the flipflops FF14 to FF17 and the selector $25_5$. The selector $25_5$ is controlled to select the output of the flipflop FF19 by the controller unit 30. The fact that the flipflop FF17 output zero results in that the adder/subtractor unit 25 calculates the term "(a0+a3)×D3+a2×D5+a1×D1", that is, the term "(f0+f4)/2". The calculated term "(f0+f4)/2" is latched by the flip-flop FF19 at the end of the CLK13.

In addition, the decoded pixel data f0, which has been stored in the flipflop FF19, is transferred to the flipflop FF20 at the end of the clock period CLK13. This allows the output of the decoded pixel data f0 from the flipflop FF20 at the following clock period CLK14.

Clock Periods CLK14 and CLK15

At the following clock period CLK14, the controller unit 30 develops the control signal S1 to indicate the rearrange circuit 12 to execute the procedure defined for the clock period CLK14. In response to the control signal S1, the rearrange circuit 12 outputs the pixel data F5, F1, F7, and F3 as the pixel data m1, m3, m5 and m7, respectively. These pixel data m1, m3, m5 and m7 and m6 are used for the calculation of the decoded pixel data f1 and f7, that is, the calculation of the second rows of the matrices in the equations (13) and (14). The output of the pixel data m1, m3, m5 and m7 allows the adders $23_1$ to $23_3$ to execute addition for calculating the decoded pixel data f1 and f7. In addition, the multipliers $23_1$ to $23_4$ execute multiplication for calculating the decoded pixel data f1 and f7.

Furthermore, the adder/subtractor unit 25 calculates the sum of the outputs of the flipflops FF14 to FF17 and the selector $25_5$. The selector $25_5$ is controlled to invert the sign of the output of the flipflop FF19 by the controller unit 30. This results in that the adder/subtractor unit 25 calculates the decoded pixel data f4, because the adder/subtractor unit 25 calculates the difference when the value "(a0+a3)×D3+a2×D5+a1×D1", which is the output of the flipflop FF19, is subtracted from the value "a5×D6+a7×D4−a6×D2−a4×D0", which is the sum of the outputs of the flip-flops FF14 to FF17. This calculation is equivalent to the calculation of the difference when the term "(f0−f4)/2" is subtracted from the term "(f0+f4)/2". The decoded pixel data f4 is latched by the flipflop FF19 at the end of the clock period CLK14.

Furthermore, the value "(a0+a3)×D3+a2×D5+a1×D1", that is, the term "(f0+f4)/2", which has been stored in the flipflop FF19, is transferred to the flipflop FF20 at the end of the clock period CLK14. It should be noted that the value "(a0+a3)×D3+a2×D5+a1×D1", latched by the flipflop FF20, is not outputted as the decoded pixel data.

The decoded pixel data f4 is then transferred from the flipflop FF19 to the flipflop FF20 at the clock period CLK15. This allows the output of the decoded pixel data f4 from the flipflop FF20.

The same goes for the decoded pixel data f1 to f3, and f5 to f7.

Second Embodiment

In a second embodiment, the image processing apparatus is designed to perform the discrete wavelet transform using the reversible 5/3 filter in addition to the discrete wavelet transform using the irreversible 9/7 filter, and the discrete cosine transform.

Figure 11:
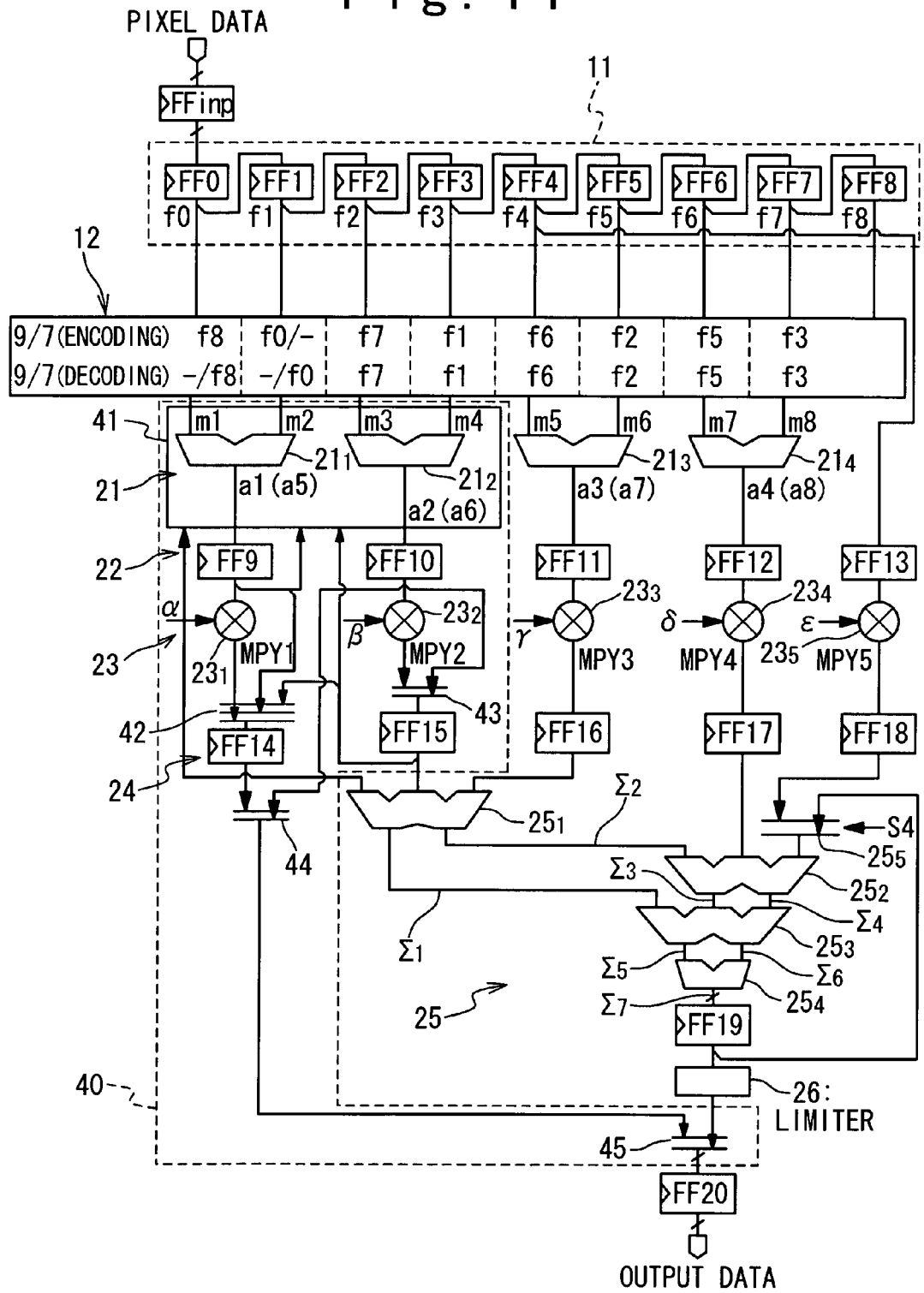
FIG. 11 is a block diagram of an image processing apparatus in a second embodiment.

FIG. 11 shows a block diagram of the image processing apparatus in the second embodiment. The image processing apparatus in the second embodiment is similar to that in the first embodiment, except for elements enclosed by a dashed line 40. In detail, additional circuits (not shown) are disposed around the adder $21_1$ and $21_2$ to form a reversible processing circuit 41. Furthermore, selectors 42 and 45 are additionally disposed.

Figure 14:
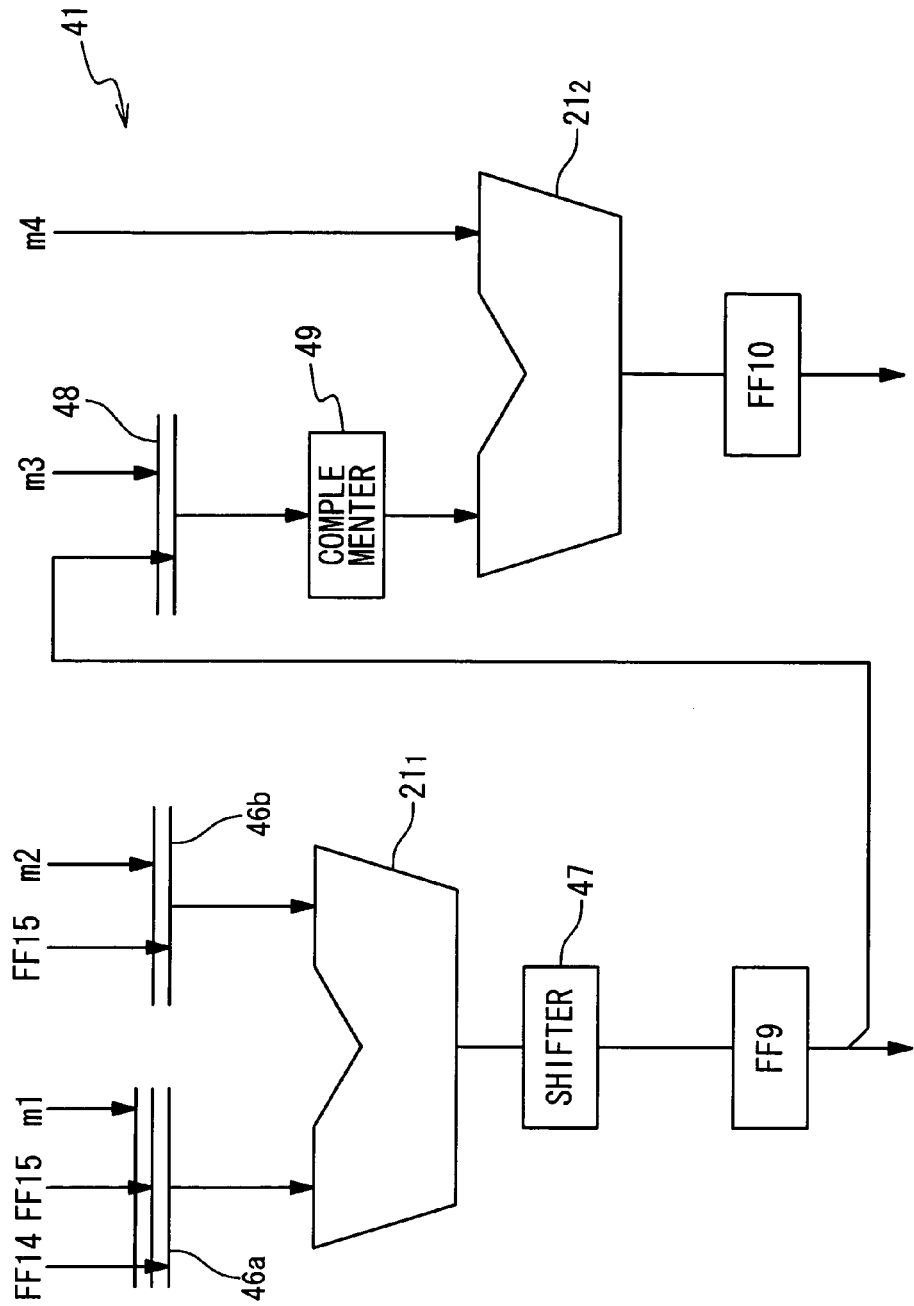
FIG. 14 is a block diagram illustrating a reversible circuit within the image processing apparatus in the second embodiment.

As shown in FIG. 14, the reversible processing circuit 41 includes selectors 46a and 46b, a shifter 47, a selector 48, and a complementer 49. The selector 46a selects one of the pixel data m1, the output of the flip-flop FF14, and the output of the flipflop FF15 in response to a control signal from the controller unit 30. The output of the selector 46a is connected to the first input of the adder $21_1$. The selector selects one of the pixel data m2 and the output of the flipflop FF15. The output of the selector 46b is connected to the second input of the adder $21_1$. The input of the shifter 47 is connected to the output of the adder $21_1$. The output of the shifter 47 is connected to the input of the flipflop FF9. The selector 48 selects one of the pixel data m3 and the output of the flipflop FF9. The output of the selector 48 is connected to the input of the complementer 49. The output of the complementer 49 is connected to the first input of the adder $21_2$. The second input of the adder $21_2$ receives the pixel data m4.

Referring back to FIG. 11, the selector 42 selects one of the outputs of the multiplier $23_1$, the flipflop FF9, and the flipflop FF15. The output of the selector 42 is connected to the flipflop FF14.

The selector 43 selects one of the outputs of the multiplier $23_2$ and the flipflop FF10. The output of the selector 43 is connected to the flipflop FF14. The selectors 42 and 43 allow the image processor to disable the multipliers $23_1$ and $23_2$ during performing the discrete wavelet transform using the reversible 5/3 filter.

The selector 44 selects one of the outputs of the flipflops FF14 and FF10. The output of the selector 44 is connected to an input of the selector 45.

The selector 45 selects one of the outputs of the selector 45 and the limiter 26. The output of the selector 45 is connected to the input of the flipflop FF20. The selector 45 is controlled to select the output of the selector 44 during performing the discrete wavelet transform using the reversible 5/3 filter. This implies that the discrete wavelet transform using the reversible 5/3 filter does not require the adder $21_3$, $21_4$, the flipflops FF11 to FF13, the multipliers $23_3$ to $23_5$, the flipflops FF16 to FF18, the adder $25_1$ to $25_4$, the selector $25_5$, and the flipflop FF19, and the limiter 26.

An explanation of the procedure of encoding through the discrete wavelet transform using the reversible 5/3 filter in this embodiment is given in the following.

As shown in FIG. 12, the encoding begins with the reception of the pixel data. The pixel data X(2n−2) to X(2n−8) are transferred to the flipflops FF0 to FF6, respectively, in synchronization with the clock signal. The pixel data X(2n−3) is associated with the pixel of interest, which is positioned in the odd numbered columns. The following is the explanation of the procedure of encoding the pixel data associated with the pixel of interest positioned in the odd numbered columns.

At a clock period CLK1, the controller unit 30 develops the control signal S1 to indicate the rearrange circuit 12 to execute the procedure defined for the clock period CLK1. In response to the control signal S1, the rearrange circuit 12 outputs the pixel data X(2n−2) and X(2n−4) as the pixel data m1, and m2, respectively.

The adder $21_1$ calculates the sum of the pixel data X(2n−2) and X(2n−4), which is used in the equation (5). The sum "X(2n−2)+X(2n−4)" is provided for the shifter 47.

The shifter 47 accomplishes 1-bit right-shift of the sum "X(2n−2)+X(2n−4)". This right-shift is equivalent to the division by 2, and thus the output of the shifter 47 is equal to [(X(2n−2)+X(2n−4))/2], where [x] is the floor function. The output of the shifter 47 is transferred to the flipflop FF9 at the end of the clock period CLK1. It should be noted that, in FIG. 12, numbers arranged in rows and columns denotes the indices specifying the pixels, the brackets "[ ]" represents that the data is processed by the floor function, and the symbols "*" represents that the associated data are intermediate results.

At the following clock period CLK2, pixel data X(2n−1) to X(2n−7) are transferred to the flipflops FF0 to FF6, respectively. The controller unit 30 develops the control signal S1 to indicate the rearrange circuit 12 to execute the procedure defined for the clock period CLK2. In response to the control signal S1, the rearrange circuit 12 outputs the pixel data X(2n−3) as the pixel data m3.

The complementer 49 develops a complement of the output of the flipflop FF9, that is, a complement of [(X(2n−2)+X(2n−4))/2], and the developed complement is inputted to the adder $21_2$. The adder $21_2$ calculates the difference when [(X(2n−2)+X(2n−4))/2] received from the flipflop FF9 is subtracted from the pixel data m4. As described in the equation (5), this achieves the calculation of the encoded pixel data Y(2n−3). The encoded pixel data Y(2n−3) is transferred to the flipflop FF10 at the end of the clock period CLK2.

The encoded pixel data Y(2n−3) is transferred to the flipflop FF15 through the selector 43. The flipflop FF15 contains the encoded pixel data Y(2n−3) till the clock period CLK4 expires. The encoded pixel data Y(2n−3) is then transferred to the flipflop FF14 through the selector 42 at the end of the clock period CLK5. The flipflop FF14 contains the encoded pixel data Y(2n−3) till the clock period CLK6 expires. Then, the encoded pixel data Y(2n−3) is transferred to the flipflop FF20 through the selectors 44 and 45 at the end of the clock period CLK7. Finally, the encoded pixel data Y(2n−3) is outputted from the flipflop FF20 at the clock period CLK8.

Below is an explanation of the procedure of encoding the pixel data associated with the pixel of interest positioned in the even numbered columns. The encoded pixel data for the even numbered columns is obtained using the intermediate results generated during the encoding for the odd numbered columns as described below.

At the clock period CLK3, the controller unit 30 develops the control signal S1 to indicate the rearrange circuit 12 to execute the procedure defined for the clock period CLK3. In response to the control signal S1, the rearrange circuit 12 outputs the pixel data X(2n) and X(2n−2) as the pixel data m1, and m2, respectively.

The adder $21_1$ calculates the sum of the pixel data X(2n) and X(2n−2), which is used in the equation (5). The sum "X(2n)+X(2n−2)" is provided for the shifter 47.

The shifter 47 accomplishes 1-bit right-shift of the sum "X(2n)+X(2n−2)". This right-shift is equivalent to the division by 2, and thus, the output of the shifter 47 is equal to [(X(2n)+X(2n−2))/2] in the equation (5). The output of the shifter 47 is transferred to the flipflop FF9 at the end of the clock period CLK3.

At the following clock period CLK4, pixel data X(2n+1) to X(2n−5) are transferred to the flipflops FF0 to FF6, respectively. The controller unit 30 develops the control signal S1 to indicate the rearrange circuit 12 to execute the procedure defined for the clock period CLK4. In response to the control signal S1, the rearrangement circuit 12 outputs the pixel data X(2n−1) as the pixel data m4.

The complementer 49 develops a complement of the output of the flipflop FF9, that is, a complement of [(X(2n)+X(2n−2))/2], and the developed complement is inputted to the adder $21_2$. The adder $21_2$ calculates the difference when [(X(2n)+X(2n−2))/2] received from the flip-flop FF9 is subtracted from the pixel data m4. As described in the equation (5), this achieves the calculation of the encoded pixel data Y(2n−1). The encoded pixel data Y(2n−1) is transferred to the flipflop FF10 at the end of the clock period CLK4. The encoded pixel data Y(2n−1) is transferred to the flipflop FF15 through the selector 43 at the end of the clock period CLK5.

At the following clock period CLK6, the adder $21_1$ receives the pixel data Y(2n−1) from the flipflop FF15, the pixel data Y(2n−3) from the flipflop FF14. The adder $21_1$ then calculates the sum of the pixel data Y(2n−1), Y(2n−3), and a constant of "2", that is, the term "Y(2n−1)+Y(2n+1)+2" in the equation (6).

The shifter 47 accomplishes 2-bit right-shift of the term "Y(2n−1)+Y(2n+1)+2". This 2-bit right-shift is equivalent to the division by 4, and thus, the output of the shifter 47 is equal to [(Y(2n−1)+Y(2n+1))/2] in the equation (5). The output of the shifter 47 is transferred to the flipflop FF9 at the end of the clock period CLK6.

At the following clock period CLK7, pixel data X(2n+4) to X(2n−2) are transferred to the flipflops FF0 to FF6, respectively. The controller unit 30 develops the control signal S1 to indicate the rearrange circuit 12 to execute the procedure defined for the clock period CLK7. In response to the control signal S1, the rearrangement circuit 12 outputs the pixel data X(2n−2) as the pixel data m4.

The adder $21_2$ calculates the sum of the pixel data X(2n−2) and the output of the flip-flop FF9, that is, [(Y(2n−1)+Y(2n+1))/2]. This achieves the calculation of the right hand of the equation (6), that is, the encoded pixel data Y(2n−2). The encoded pixel data Y(2n−2) is transferred to the flipflop FF10 at the end of the clock period CLK7. The pixel data Y(2n−2) is then transferred to the flipflop FF20 through the selectors 44 and 45 at the end of the clock period CLK8. This allows the output of the encoded pixel data Y(2n−2) from the flipflop FF20 at the following clock period CLK9.

FIG. 13 is a timing chart describing the procedure of decoding through the discrete wavelet transform using the reversible 5/3 filter. The procedure of the decoding is almost similar to the aforementioned encoding except for that the equations (7) and (8) are used in place of the equations (5) and (6). Therefore, detailed explanation is not given.

As thus-described, the image processing apparatus in accordance with the present invention can perform both the discrete wavelet transform and the discrete cosine transform by using the same circuitry. This effectively reduces the necessary hardware resources.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. An image processing apparatus comprising:
    an input unit for receiving a plurality of pixel data, wherein said input unit includes:
        a plurality of flipflops which respectively stores therein one of said plurality of pixel data,
        a rearrangement unit for receiving said plurality of pixel data from said plurality of flipflops and rearranging said received pixel data so as to be adaptive to said desired transform in response to a control signal received from said control unit,
    wherein said processing unit includes:
        a plurality of adders, each receiving two of said plurality of pixel data selected by said rearrangement unit to calculate a sum of said received two pixel data,
        a plurality of multipliers, each calculating a product of associated one of said sums and associated one of said plurality of said coefficients,
        another multiplier receiving one of said plurality of pixel data from one of said flipflops and calculating a product of said received pixel data and associated one of said plurality of said coefficients,
        a selector; and
        an adder/subtractor unit,
    wherein said selector selects one of outputs of said another multiplier and said adder/subtractor unit, and
    wherein said adder/subtractor unit executes operation on said products received from said plurality of multipliers and an output of said selector to obtain a result data of said desired transform;
    a controlling unit for selecting a desired transform from among discrete wavelet transform and discrete cosine transform, and providing a plurality of coefficients depending on said desired transform; and
    a processing unit for processing said pixel data using said plurality of coefficients to achieve said desired transform.

2. The image processing apparatus according to claim 1, wherein said input unit includes:
    a storage unit for storing said pixel data; and
    a rearrangement unit for receiving and rearranging said pixel data so as to be adaptive to said desired transform in response to a control signal received from said control unit;
    wherein said processing unit processes said rearranged pixel data to achieve said desired transform.

3. The image processing apparatus according to claim 1, wherein said controlling unit selects one procedure from among encoding and decoding through said desired transform, and develops said plurality of coefficients depending on said selected procedure.

4. The image processing apparatus according to claim 2, wherein said controlling unit selects one procedure from among encoding and decoding through said desired transform, and develops said control signal to allow said rearrangement unit to be adaptive to said selected procedure.

5. The image processing apparatus according to claim 1, wherein said controlling unit selects one of an irreversible 9/7 filter and a reversible 5/3 filter to be used when selecting said discrete wavelet transform, and develops said plurality of coefficients depending on said selected filter.

6. The image processing apparatus according to claim 2, wherein said controlling unit selects one of an irreversible 9/7 filter and a reversible 5/3 filter to be used when selecting said discrete wavelet transform, and develops said control signal to allow said rearrangement unit to be adaptive to said selected procedure.

* * * * *